United States Patent
Zhang et al.

(10) Patent No.: US 10,848,274 B2
(45) Date of Patent: Nov. 24, 2020

(54) USER SEQUENCE TRANSMISSION METHOD, NETWORK DEVICE, AND TERMINAL DEVICE

(71) Applicant: HUAWEI TECHNOLOGIES CO., LTD., Shenzhen (CN)

(72) Inventors: Huazi Zhang, Hangzhou (CN); Jian Wang, Hangzhou (CN); Rong Li, Hangzhou (CN); Rongdao Yu, Shenzhen (CN); Lu Rong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 16/231,521

(22) Filed: Dec. 23, 2018

(65) Prior Publication Data

US 2019/0132084 A1     May 2, 2019

Related U.S. Application Data

(63) Continuation of application No. PCT/CN2017/089502, filed on Jun. 22, 2017.

(30) Foreign Application Priority Data

Jun. 23, 2016 (CN) .......................... 2016 1 0464260

(51) Int. Cl.
*H04L 1/06* (2006.01)
*H04W 24/08* (2009.01)
(Continued)

(52) U.S. Cl.
CPC ........ *H04L 1/0618* (2013.01); *H04J 11/0026* (2013.01); *H04J 13/00* (2013.01);
(Continued)

(58) Field of Classification Search
CPC ..... H04W 28/02; H04W 72/04; H04W 24/08; H04W 72/0446; H04W 28/0226; H04L 1/06; H04L 1/0618
See application file for complete search history.

(56) References Cited

U.S. PATENT DOCUMENTS

| | | |
|---|---|---|
| 2009/0073944 A1 | 3/2009 | Jiang et al. |
| 2012/0172048 A1 | 7/2012 | Kato et al. |
| | (Continued) | |

FOREIGN PATENT DOCUMENTS

| | | |
|---|---|---|
| CN | 102474859 A | 5/2012 |
| CN | 103765802 A | 4/2014 |
| | (Continued) | |

OTHER PUBLICATIONS

ETSI TS 136 321 V12.4.0 (Feb. 2015), "LTE; Evolved Universal Terrestrial Radio Access (E-UTRA); Medium Access Control (MAC) protocol specification(3GPP TS 36.321 version 12.4.0 Release 12)", total 62 pages.
(Continued)

*Primary Examiner* — Chi Ho A Lee
(74) *Attorney, Agent, or Firm* — Kilpatrick Townsend & Stockton LLP

(57) ABSTRACT

This application discloses a user sequence transmission method, a network device, and a terminal device. The method includes: sending, by a network device, first signaling to a terminal device, where the first signaling includes first information indicating a quantity of user sequences in a first user sequence space, and the user sequences in the first user sequence space include a universal set of user sequences used by the terminal device served by the network device; receiving, by the network device, a first user sequence sent by the terminal device based on the first information; and performing, by the network device, user
(Continued)

detection and/or communication parameter estimation based on the first user sequence.

20 Claims, 12 Drawing Sheets

(51) Int. Cl.
| | | |
|---|---|---|
| *H04W 28/02* | (2009.01) | |
| *H04J 13/00* | (2011.01) | |
| *H04W 74/08* | (2009.01) | |
| *H04J 11/00* | (2006.01) | |
| *H04W 72/04* | (2009.01) | |
| *H04L 1/00* | (2006.01) | |

(52) U.S. Cl.
CPC .......... *H04W 24/08* (2013.01); *H04W 28/02* (2013.01); *H04W 28/0226* (2013.01); *H04W 72/0446* (2013.01); *H04W 74/0833* (2013.01); *H04L 1/0057* (2013.01)

(56) References Cited

U.S. PATENT DOCUMENTS

| | | | | |
|---|---|---|---|---|
| 2012/0300714 | A1* | 11/2012 | Ng | H04W 56/0045 370/329 |
| 2013/0301591 | A1* | 11/2013 | Meyer | H04W 72/0446 370/329 |
| 2013/0343294 | A1 | 12/2013 | Ogawa et al. | |
| 2014/0219185 | A1 | 8/2014 | Etemad et al. | |
| 2014/0226630 | A1* | 8/2014 | Comstock | H04W 16/14 370/331 |
| 2014/0269605 | A1* | 9/2014 | Pecen | H04W 56/00 370/330 |
| 2015/0312016 | A1* | 10/2015 | Farkas | H04L 5/0073 455/450 |
| 2016/0050667 | A1* | 2/2016 | Papasakellariou | H04L 5/0053 370/329 |
| 2017/0366310 | A1* | 12/2017 | Verma | H04L 5/005 |
| 2017/0367110 | A1* | 12/2017 | Li | H04W 4/70 |
| 2018/0020378 | A1* | 1/2018 | Tsuboi | H04W 28/18 |
| 2018/0192435 | A1* | 7/2018 | Benjebbour | H04W 72/02 |
| 2018/0279381 | A1* | 9/2018 | Tabet | H05K 999/99 |
| 2019/0116614 | A1* | 4/2019 | Li | H04W 74/085 |

FOREIGN PATENT DOCUMENTS

| | | |
|---|---|---|
| CN | 104640222 A | 5/2015 |
| CN | 105634709 A | 6/2016 |
| EP | 1971092 A1 | 9/2008 |
| EP | 1971097 A2 | 9/2008 |
| EP | 2464186 A1 | 6/2012 |
| WO | 2009019878 A1 | 2/2009 |

OTHER PUBLICATIONS

ETSI TS 136 211 V12.4.0 (Feb. 2015), "LTE; Evolved Universal Terrestrial Radio Access (E-UTRA); Physical channels and modulation(3GPP TS 36.211 version 12.4.0 Release 12)", total 128 pages.
Robert Calderbank and Sina Jafarpour, "Reed Muller Sensing Matrices and the LASSO". In Sequences and Their Applications—SETA 2010 (pp. 442-463). Springer Berlin Heidelberg.
3GPP TS 36.211 V12.4.0 (Dec. 2014), 3rd Generation Partnership Project; Technical Specification Group Radio Access Network; Evolved Universal Terrestrial Radio Access (E-UTRA); Physical channels and modulation(Release 12), total 124 pages.
3GPP TS 36.321 V12.4.0 (Dec. 2014), 3rd Generation Partnership Project;Technical Specification Group Radio Access Network; Evolved Universal Terrestrial Radio Access (E-UTRA); Medium Access Control (MAC) protocol specification (Release 12), total 60 pages.
3GPP TS 36.331 V13.1.0 (Mar. 2016), 3rd Generation Partnership Project; Technical Specification Group Radio Access Network; Evolved Universal Terrestrial Ratio Access (E-UTRA); Radio Resource Control (RRC); Protocol specification (Release 13), total 551 pages.

* cited by examiner

| Granularity | Relative value of a size of a user sequence space |
|---|---|

Bits: 1  2  3  4  5  6  7  8  9  10  11  12

FIG. 5

USER SEQUENCE TRANSMISSION METHOD, NETWORK DEVICE, AND TERMINAL DEVICE

CROSS-REFERENCE TO RELATED APPLICATIONS

This application is a continuation of International Application No. PCT/CN2017/089502, filed on Jun. 22, 2017, which claims priority to Chinese Patent Application No. 201610464260.3, filed on Jun. 23, 2016. The disclosures of the aforementioned applications are hereby incorporated by reference in their entireties.

TECHNICAL FIELD

This application relates to the communications field, and more specifically, relates to a user sequence transmission method, a network device, and a terminal device.

BACKGROUND

With rapid development of communications technologies, an Internet of Things (Internet of Things, IoT) technology gains more attention from the industry. Different from a mobile broadband (Mobile Broad Band, MBB) service, a main service scenario of an IoT is massive machine type communication (Machine-Type Communications, MTC) and/or high-reliability machine type communication. Main features of massive MTC are massive connections, small data packets, low costs, and the like. Therefore, an IoT service becomes one of main services supported by a cellular mobile communications system.

Usually, uplink user status information is multiplexed and transmitted on a time-frequency resource shared by systems, and may be used in a plurality of scenarios. For example, the uplink user status information may be used for a random access signal (specifically, such as a preamble (Preamble)) in a random access process in an existing Long Term Evolution (Long Term Evolution, LTE) protocol, may be used for a user detection reference signal (User Detection Reference Signal, UDRS) before uplink data transmission, or may be used for a demodulation reference signal (Demodulation Reference Signal, DMRS). In these scenarios, a user selects a user sequence from a particular quantity of user sequence sets, and transmits the user sequence. The user sequence mainly plays a role in identifying the user. A base station detects the user sequence sent by the user, that is, performs a user detection process, and may also perform channel estimation or time-frequency offset estimation based on the user sequence.

If two users happen to simultaneously select and send a same user sequence, the base station considers that the user sequence is corresponding to only one access user. This case is referred to as a collision. Usually, a collision causes a failure of subsequent data transmission, and has a great impact on performance of a communications system. A set of user sequences that can be selected by a user is referred to as a user sequence space, and a size of the user sequence space directly determines a probability of a collision between users. A larger user sequence space indicates a smaller collision probability. User sequences in an existing user sequence space are mutually orthogonal, and a size of the user sequence space is limited by a length of the user sequence.

A conventional cellular mobile communications system is mainly designed for the MBB service without considering a massive connection scenario. In the MBB service, a quantity of access users and a quantity of potential access users both are relatively limited. Therefore, when a user sequence space is designed for the system, a quantity of available user sequences is usually stipulated in a protocol, and only a relatively small and fixed total quantity of available user sequences are provided. For example, on a physical random access channel (Physical Random Access Channel, PRACH) in an LTE system, only 54 Zadoff-Chu (ZC) sequences are provided for contention-based access.

In the massive connection scenario of the IoT service, because a quantity of connections and a quantity of access users are large, if a size of a user sequence set is designed the same as that designed for MBB, a probability that a collision occurs is greatly increased, that is, a conflict probability is greatly increased.

SUMMARY

This application provides a user sequence transmission method, to flexibly specify a size of a user sequence space, and improve work efficiency of a system.

According to a first aspect, this application provides a user sequence transmission method, including: sending, by a network device, first signaling to a terminal device, where the first signaling includes first information indicating a quantity of user sequences in a first user sequence space, and the user sequences in the first user sequence space include a universal set of user sequences used by the terminal device served by the network device; receiving, by the network device, a first user sequence sent by the terminal device based on the first information; and performing, by the network device, user detection and/or communication parameter estimation based on the first user sequence.

The network device may be a network device in a cell, or may be a base station in a cell sense or a network device having a function similar to that of a base station, for example, a wireless router and a radio access point (Access Point, AP). The network device may be a network device that provides wireless access and communication services for a mobile or fixed terminal device in a cell.

All terminal devices served by the network device include a terminal device that accesses the network device, a terminal device that camps on the network device, and the like; or include a terminal device that accesses the network device, a terminal device that performs uplink/downlink communication by using the network device, a terminal device that camps on a serving area of the network device and that may perform access or uplink/downlink communication, and the like. The serving area of the network device may be an area covered by an air interface of the network device.

The first user sequence is a user sequence in the first user sequence space.

The user sequences in the first user sequence space include the universal set of user sequences used by the terminal device served by the network device. Alternatively, it may be described as follows: The user sequences in the first user sequence space include all user sequences used by the terminal device served by the network device, or the user sequences in the first user sequence space include a union set of user sequences used by all the terminal devices served by the network device.

In the user sequence transmission method provided in the first aspect, the network device sends, to the terminal device, the first information indicating the quantity of user sequences in the first user sequence space, and the user sequences in the first user sequence space include the universal set of user sequences used by the terminal device served by the network device. Therefore, a size of a user sequence space that can be used by all the terminal devices served by the network device may be flexibly specified, so as to support size adjustment for the user sequence space, thereby improving accuracy of user detection or communication parameter estimation, and improving work efficiency of a system.

In a possible implementation of the first aspect, the universal set of user sequences used by the terminal device served by the network device includes a user sequence used for contention-based access and/or a user sequence for non-contention-based access; or in other words, the first user sequence space may include a user sequence used by the terminal device for contention-based access and/or a user sequence used by the terminal device for non-contention-based access. For a case in which user sequences that can be used by the terminal device include a user sequence used by the terminal device for contention-based access and a user sequence used by the terminal device for non-contention-based access, the user sequence transmission method may include: sending, by the network device, the first signaling to the terminal device, where the first signaling includes information about a quantity of user sequences used for contention-based access and information about a quantity of user sequences used for non-contention-based access, and the user sequence used for contention-based access and the user sequence used for non-contention-based access form the first user sequence space; receiving, by the network device, the first user sequence sent by the terminal device based on the quantity of user sequences used for contention-based access and/or the quantity of user sequences used for non-contention-based access; and performing, by the network device, user detection and/or communication parameter estimation based on the first user sequence.

In a possible implementation of the first aspect, the universal set of user sequences used by the terminal device served by the network device includes a user sequence used for scheduling-free based access and/or a user sequence used for access that is based on scheduling performed by the network device; or in other words, the user sequences in the first user sequence space include a user sequence used for scheduling-free based access and/or a user sequence used for access that is based on scheduling performed by the network device.

In a possible implementation of the first aspect, the universal set of user sequences used by the terminal device served by the network device includes a user sequence used for autonomous (autonomous) access and/or a user sequence used for access that is supervised (supervised) by the network device; or in other words, the user sequences in the first user sequence space include a user sequence used for autonomous (autonomous) access and/or a user sequence used for access that is supervised (supervised) by the network device.

In a possible implementation of the first aspect, after the sending, by a network device, first signaling to a terminal device, the method further includes: sending, by the network device, second signaling to the terminal device, where the second signaling includes second information indicating a quantity of user sequences in a second user sequence space, the second user sequence space includes a first space subset and a second space subset, the first space subset and the second space subset are completely different, user sequences included in the first space subset are completely the same as the user sequences in the first user sequence space, and a degree of coherence between each user sequence in the second space subset and the user sequence in the first space subset is less than or equal to a degree of coherence between a user sequence outside the second user sequence space and the user sequence in the first space subset.

In another possible implementation of the first aspect, the first user sequence space includes a third space subset and a fourth space subset, the third space subset and the fourth space subset are completely different, and a degree of coherence between each user sequence in the fourth space subset and a user sequence in the third space subset is greater than or equal to a degree of coherence between any two user sequences in the third space subset; and after the sending, by a network device, first signaling to a terminal device, the method further includes: sending, by the network device, third signaling to the terminal device, where the third signaling includes third information indicating a quantity of user sequences in a third user sequence space, and user sequences in the third user sequence space are completely the same as user sequences included in the third space subset.

The first user sequence space is extended to the second user sequence space, and a maximum coherence degree of the second user sequence space obtained after extension is greater than or equal to a maximum coherence degree of the first user sequence space before extension. The maximum coherence degree is a maximum value of a degree of coherence between any two user sequences in the user sequence space. The first user sequence space is reduced to the third user sequence space, and a maximum coherence degree of the third user sequence space obtained after reduction is less than or equal to a maximum coherence degree of the first user sequence space before reduction.

In the foregoing two possible implementations, a user sequence space may be flexibly extended or reduced through signaling notification, and a maximum coherence degree of a user sequence space obtained after extension or reduction keeps as small as possible, so that accuracy of user detection or communication parameter estimation may be ensured.

When the user sequence space is extended, in addition to directly notifying the quantity of user sequences in the second user sequence space obtained after extension, a change value between the quantity of user sequences in the first user sequence space and the quantity of user sequences in the second user sequence space obtained after extension may be notified. Therefore, after the first signaling is sent to the terminal device, the method may further include: sending, by the network device, second signaling to the terminal device, where the second signaling includes second information indicating a change between the quantity of user sequences in the second user sequence space and the quantity of user sequences in the first user sequence space, the second user sequence space includes a first space subset and a second space subset, the first space subset and the second space subset are completely different, user sequences included in the first space subset are completely the same as the user sequences in the first user sequence space, and a degree of coherence between each user sequence in the second space subset and the user sequence in the first space subset is less than or equal to a degree of coherence between a user sequence outside the second user sequence space and the user sequence in the first space subset.

When the user sequence space is reduced, in addition to directly notifying the quantity of user sequences in the second user sequence space obtained after reduction, a change value between the quantity of user sequences in the first user sequence space and the quantity of user sequences in the second user sequence space obtained after reduction may be notified. Therefore, after the network device sends the first signaling to the terminal device, the method may further include: sending, by the network device, third signaling to the terminal device, where the third signaling includes third information indicating a change between the quantity of user sequences in the third user sequence space and the quantity of user sequences in the first user sequence space, the first user sequence space includes a third space subset and a fourth space subset, the third space subset and the fourth space subset are completely different, user sequences included in the third space subset are completely the same as user sequences in the third user sequence space, and a degree of coherence between each user sequence in the fourth space subset and a user sequence in the third space subset is greater than or equal to a degree of coherence between any two user sequences in the third space subset.

In a possible implementation of the first aspect, before the sending, by a network device, first signaling to a terminal device, the method may further include: determining, by the network device, the quantity of user sequences in the first user sequence space based on current network load and a current system parameter, where the system parameter includes at least one of a user sequence length, a collision probability tolerance value, a detection omission probability tolerance value, a timing estimation error, a channel estimation error, a bit error rate, a size of an available time-frequency resource, a size of an available computing resource, signal received power, and a signal-to-noise ratio.

In this possible implementation, based on different application scenarios, the network device determines the quantity of user sequences in the first user sequence space based on the current network load and the current system parameter, so as to more accurately determine a size of the first user sequence space. Therefore, the size of the user sequence space is more helpful in improving accuracy of user detection or communication parameter estimation, and improving work efficiency of a system.

After receiving the first user sequence, the network device may be applied to the following scenarios:

The first user sequence is a random access signal, and the performing, by the network device, user detection and/or communication parameter estimation based on the first user sequence includes: performing, by the network device, user detection based on the random access signal, and performing a random access process for the terminal device.

The first user sequence is a user detection reference signal, and the performing, by the network device, user detection and/or communication parameter estimation based on the first user sequence includes: performing, by the network device, user detection based on the user detection reference signal, and determining at least one of a time domain resource, a frequency domain resource, and a code domain resource that are used when the terminal device performs data transmission.

The first user sequence is a demodulation reference signal, and the performing, by the network device, user detection and/or communication parameter estimation based on the first user sequence includes: performing, by the network device, communication parameter estimation based on the demodulation reference signal, to demodulate data, where communication parameter estimation includes at least one of time offset estimation, frequency offset estimation, and channel estimation.

In a possible implementation of the first aspect, the sending, by a network device, first signaling to a terminal device includes: sending, by the network device, the first signaling to the terminal device through broadcast. Sending the first signaling through broadcast is a simple and highly efficient implementation.

In a possible implementation of the first aspect, the first user sequence is generated by the terminal device according to a formula $\phi_{P,b}(x)=A\cdot i^{(2b+Px)^T x}$, where x=bin(k), a value of k is 0, 1, ..., $2^m-1$, bin(k) is a binary vector representation of k, A is an amplitude normalization parameter, P is a generator matrix, and b is a generator vector. The first user sequence in this implementation is an RM sequence. By using the RM sequence, extremely low detection complexity can be achieved while a user sequence space is greatly extended.

According to a second aspect, this application provides a user sequence transmission method, including: receiving, by a terminal device, first signaling sent by a network device, where the first signaling includes first information indicating a quantity of user sequences in a first user sequence space, and the user sequences in the first user sequence space include a universal set of user sequences used by the terminal device served by the network device; and sending, by the terminal device, a first user sequence to the network device based on the first information.

In a possible implementation of the second aspect, after the receiving, by a terminal device, first signaling sent by a network device, the method further includes: receiving, by the terminal device, second signaling sent by the network device, where the second signaling includes second information indicating a quantity of user sequences in a second user sequence space, the second user sequence space includes a first space subset and a second space subset, the first space subset and the second space subset are completely different, user sequences included in the first space subset are completely the same as the user sequences in the first user sequence space, and a degree of coherence between each user sequence in the second space subset and the user sequence in the first space subset is less than or equal to a degree of coherence between a user sequence outside the second user sequence space and the user sequence in the first space subset.

In another possible implementation of the second aspect, the first user sequence space includes a third space subset and a fourth space subset, the third space subset and the fourth space subset are completely different, and a degree of coherence between each user sequence in the fourth space subset and a user sequence in the third space subset is greater than or equal to a degree of coherence between any two user sequences in the third space subset; and after the receiving, by a terminal device, first signaling sent by a network device, the method further includes: receiving, by the terminal device, third signaling sent by the network device, where the third signaling includes third information indicating a quantity of user sequences in a third user sequence space, and user sequences in the third user sequence space are completely the same as user sequences included in the third space subset.

In a possible implementation of the second aspect, the sending, by the terminal device, a first user sequence to the network device based on the first information includes: generating, by the terminal device based on the quantity that is of user sequences in the first user sequence space and that is indicated by the first information, the first user sequence belonging to the first user sequence space; and sending, by the terminal device, the first user sequence to the network device.

In a possible implementation of the second aspect, the receiving, by a terminal device, first signaling sent by a network device includes: receiving, by the terminal device, the first signaling sent by the network device through broadcast.

In a possible implementation of the second aspect, before the sending, by the terminal device, a first user sequence to the network device based on the first information, the method further includes: generating, by the terminal device, the first user sequence according to a formula $\phi_{P,b}(x)=A \cdot i^{(2b+Px)^T x}$, where x=bin(k), a value of k is 0, 1, ..., $2^m-1$, bin(k) is a binary vector representation of k, A is an amplitude normalization parameter, P is a generator matrix, and b is a generator vector. The first user sequence generated in this implementation is an RM sequence. By using the RM sequence, extremely low detection complexity can be achieved while a user sequence space is greatly extended.

For beneficial effects of the second aspect and possible designs of the second aspect, refer to beneficial effects corresponding to the first aspect and corresponding features of the first aspect. Details are not described herein again.

In possible implementations of the first aspect and the second aspect, a degree of coherence between any two user sequences in the first user sequence space may be greater than or equal to 0 and less than or equal to a first threshold. When the degree of coherence between any two user sequences in the first user sequence space is equal to 0, the first user sequence is completely orthogonal. When a degree of coherence between at least one pair of user sequences in the first user sequence space is greater than 0, the first user sequence space is quasi-orthogonal.

The first threshold may be determined based on a user sequence length.

In possible implementations of the first aspect and the second aspect, the first signaling further includes fourth information indicating a type of the user sequence in the first user sequence space. The type of the user sequence in the first user sequence space may include a Reed-Muller sequence or a Zadoff-Chu sequence.

The Reed-Muller sequence is used in this implementation, so that extremely low detection complexity can be achieved while a user sequence space is greatly extended.

In possible implementations of the first aspect and the second aspect, the first information includes a space level of the first user sequence space, or a quantized value indicating the quantity of user sequences in the first user sequence space. The space level of the first user sequence space may be a quantity of values of a maximum coherence degree of a subspace that can be obtained by dividing the first user sequence space.

A specific implementation may be as follows: The sending, by a network device, first signaling to a terminal device may include: sending, by the network device, the first signaling to the terminal device by adding, to a system information block SIB, the first information indicating the space level of the first user sequence space or the quantized value indicating the quantity of user sequences in the first user sequence space. Alternatively, the sending, by a network device, first signaling to a terminal device may include: sending, by the network device, the first signaling to the terminal device by adding, to a SIB, the fourth information indicating the type of the user sequence in the first user sequence space.

In possible implementations of the first aspect and the second aspect, the first information may be an index indicating a configuration of the first user sequence space, the index is agreed on in advance in the network device and the terminal device by using a standard, and the configuration of the first user sequence space includes the quantity of user sequences in the first user sequence space. The configuration of the first user sequence space may further include at least one of the type of the user sequence in the first user sequence space, the space level of the first user sequence space, and a length of the user sequence in the first user sequence space.

In the foregoing two possible implementations, the space level, the quantized value, or the index is indicating a size of a user sequence space. When the first information is the space level, the quantized value, or the index, the first information can occupy an extremely small quantity of bits, so as to reduce signaling overheads and improve resource utilization.

According to a third aspect, this application provides a user sequence transmission method, including: sending, by a network device, first signaling to a terminal device, where the first signaling includes first information indicating orthogonality of a first user sequence space; receiving, by the network device, a first user sequence sent by the terminal device based on the orthogonality of the first user sequence space; and performing, by the network device, user detection and/or communication parameter estimation based on the first user sequence.

In a possible implementation of the third aspect, the first information is a maximum value of a degree of coherence between any two user sequences in the first user sequence space.

In another possible implementation of the third aspect, the first information is a space level of the first user sequence space, and the space level is a quantity of values of a maximum coherence degree of a subspace that can be obtained by dividing the first user sequence space.

In a possible implementation of the third aspect, after the sending, by a network device, first signaling to a terminal device, the method further includes: sending, by the network device, second signaling to the terminal device, where the second signaling includes second information indicating orthogonality of a second user sequence space, and the orthogonality of the second user sequence space is weaker than or equal to the orthogonality of the first user sequence space.

A specific implementation may be as follows: After the sending, by a network device, first signaling to a terminal device, the method further includes: sending, by the network device, the second signaling to the terminal device, where the second signaling includes the second information indicating the orthogonality of the second user sequence space, and a maximum value of a degree of coherence between any two user sequences in the second user sequence space is greater than or equal to a maximum value of a degree of coherence between any two user sequences in the first user sequence space.

Alternatively, a specific implementation may be as follows: After the sending, by a network device, first signaling to a terminal device, the method further includes: sending, by the network device, the second signaling to the terminal device, where the second signaling includes the second information indicating the orthogonality of the second user sequence space, and a space level of the second user sequence space is greater than or equal to the space level of the first user sequence space.

In another possible implementation of the third aspect, after the sending, by a network device, first signaling to a terminal device, the method further includes:

sending, by the network device, third signaling to the terminal device, where the third signaling includes third information indicating orthogonality of a third user sequence space, and the orthogonality of the third user sequence space is stronger than or equal to the orthogonality of the first user sequence space.

A specific implementation may be as follows: After the sending, by a network device, first signaling to a terminal device, the method further includes: sending, by the network device, the third signaling to the terminal device, where the third signaling includes the third information indicating the orthogonality of the third user sequence space, and a maximum value of a degree of coherence between any two user sequences in the third user sequence space is less than or equal to a maximum value of a degree of coherence between any two user sequences in the first user sequence space.

Alternatively, a specific implementation may be as follows: After the sending, by a network device, first signaling to a terminal device, the method further includes: sending, by the network device, the third signaling to the terminal device, where the third signaling includes the third information indicating the orthogonality of the third user sequence space, and a space level of the third user sequence space is less than or equal to the space level of the first user sequence space.

For beneficial effects of the third aspect and possible designs of the third aspect, refer to beneficial effects corresponding to the first aspect, the second aspect, and corresponding features of the first aspect and the second aspect. Details are not described herein again.

According to a fourth aspect, this application provides a network device, including a sending module, a receiving module, and a processing module, and having functions for implementing behavior of the network device in the foregoing aspects. The function may be implemented by using hardware or may be implemented by executing corresponding software by hardware. The hardware or the software includes one or more modules corresponding to the foregoing functions.

According to a fifth aspect, this application provides a network device, including a receiver, a transmitter, and a processor that are configured to support the network device in performing corresponding functions in the foregoing methods. The receiver and the transmitter are configured to support communication between the network device and a terminal device. The network device may further include a memory. The memory is configured to be coupled to the processor, and the memory stores a necessary program instruction and data.

According to a sixth aspect, this application provides a terminal device, including a receiving module and a sending module, and having functions for implementing behavior of the terminal device in the foregoing aspects. The function may be implemented by using hardware or may be implemented by executing corresponding software by hardware. The hardware or the software includes one or more modules corresponding to the foregoing functions. The terminal device may further include a generation module, to complete a corresponding function.

According to a seventh aspect, this application provides a terminal device, including a receiver and a transmitter that are configured to support the terminal device in performing corresponding functions in the foregoing methods. The receiver and the transmitter are configured to support communication between the terminal device and a network device. The terminal device may further include a memory. The memory is configured to be coupled to the processor, and the memory stores a necessary program instruction and data.

It should be understood that the first signaling in this application may be carried in downlink control information DCI, or may be carried in radio resource control RRC signaling.

It should be understood that the second signaling in this application may be carried in DCI, or may be carried in RRC signaling.

It should be understood that the third signaling in this application may be carried in DCI, or may be carried in RRC signaling.

In this application, the first signaling may further include information indicating whether to use a scheduling-free transmission mode.

In this application, before the sending, by a network device, first signaling to a terminal device, the method may further include: sending, by the network device, fourth signaling to the terminal device, where the fourth signaling indicates whether to use a scheduling-free transmission mode.

In this application, the first information, the second information, or the third information may be an index, and the index may include a root index and an offset that are of a demodulation reference signal DMRS.

BRIEF DESCRIPTION OF DRAWINGS

FIG. 5 is a schematic diagram indicating a size of a user sequence space according to an embodiment of this application;

DESCRIPTION OF EMBODIMENTS

Figure 1:
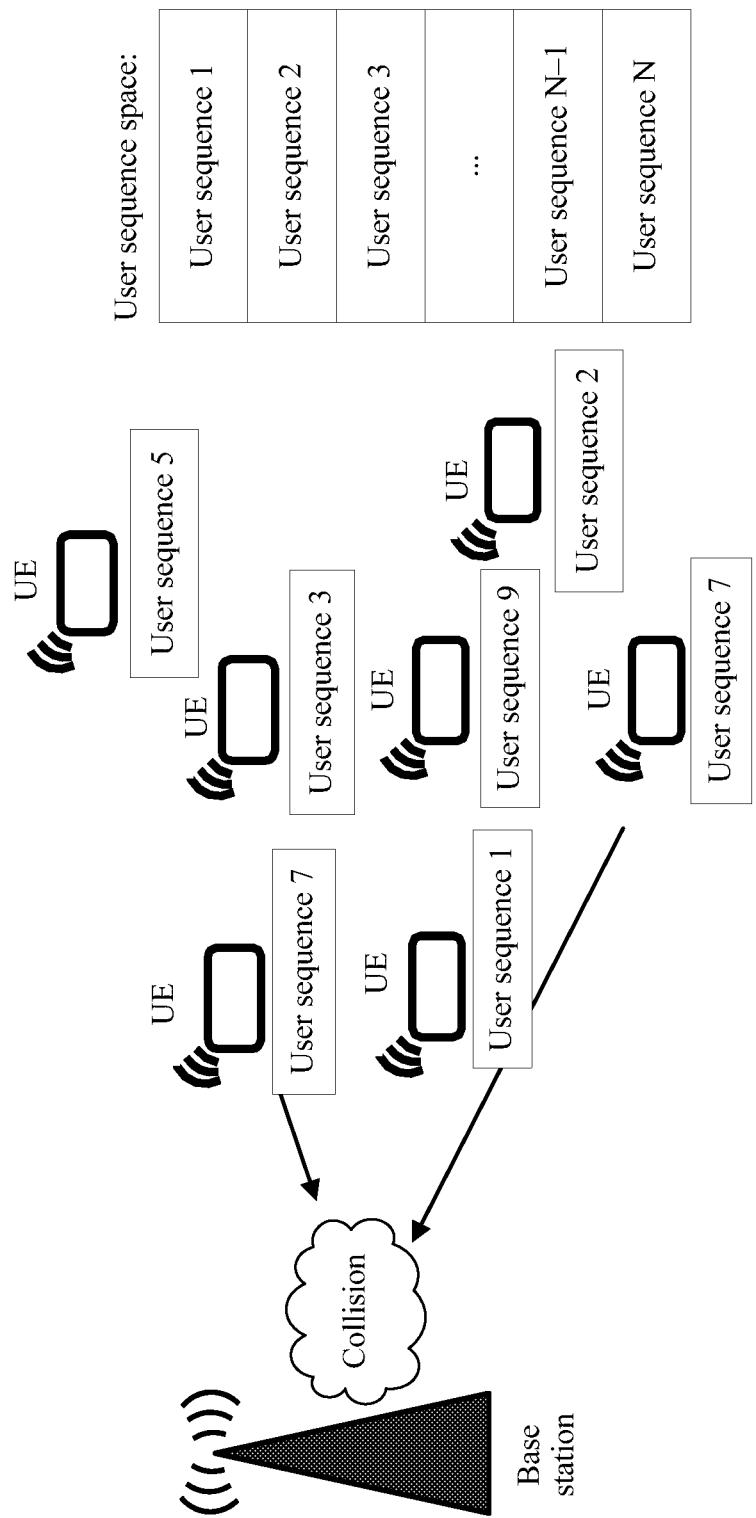
FIG. 1 is a schematic diagram of a communication scenario to which this application is applied.

The following describes the technical solutions in this application with reference to the accompanying drawings.

Terminologies such as "component", "module", and "system" used in this specification are indicating computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the technical solutions in the embodiments of this application may be applied to a Long Term Evolution (Long Term Evolution, LTE) architecture, and may be further applied to a Universal Mobile Telecommunications System (Universal Mobile Telecommunications System, UMTS) Terrestrial Radio Access Network (UMTS Terrestrial Radio Access Network, UTRAN) architecture, or a Global System for Mobile Communications (Global System for Mobile Communication, GSM)/Enhanced Data rates for GSM Evolution (Enhanced Data Rate for GSM Evolution, EDGE) system radio access network (GSM EDGE Radio Access Network, GERAN) architecture. In the UTRAN architecture or the GERAN architecture, a function of an MME is completed by a serving general packet radio service (General Packet Radio Service, GPRS) support node (Serving GPRS Support, SGSN), and a function of an SGW/PGW is completed by a gateway GPRS support node (Gateway GPRS Support Node, GGSN). The technical solutions in the embodiments of this application may be further applied to another communications system, for example, a public land mobile network (Public Land Mobile Network, PLMN) system, or even a future 5G communications system or a communications system after 5G. This is not limited in the embodiments of this application.

The embodiments of this application relate to a terminal device. The terminal device may be user equipment (User Equipment, UE), an access terminal, a subscriber unit, a subscriber station, a mobile station, a mobile station, a remote station, a remote terminal, a mobile device, a user terminal, a terminal, a wireless communications device, a user agent, or user equipment. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, or a terminal device in a future 5G network or a network after 5G. This is not limited in the embodiments of this application.

The terminal device may communicate with one or more core networks by using a radio access network (Radio Access Network, RAN), or may access, in a self-organizing or grant-free manner, a distributed Ad-Hoc (Ad-Hoc) mode network and a subnetwork deployed by a user. The terminal device may alternatively access a network in another manner to perform communication. This is not limited in the embodiments of this application.

The embodiments of this application further relate to a network device. The network device may be a device configured to communicate with a terminal device. For example, the network device may be a base transceiver station (Base Transceiver Station, BTS) in a GSM or CDMA system, or may be a NodeB (NodeB, NB) in a WCDMA system, or may be an evolved NodeB (Evolutional Node B, eNB or eNodeB) in an LTE system; or the network device may be a relay node, an access point, an in-vehicle device, a wearable device, a network side device in a future 5G network or a network after 5G, a network device in a future evolved PLMN network, or the like.

The network device in the embodiments of this application may be a network device in a cell, or may be a base station in a cell sense or a network device having a function similar to that of a base station. The network device may be a network device that provides wireless access and communication services for a mobile or fixed terminal device in a cell.

In addition, aspects or features of this application may be implemented as a method, an apparatus, or a product that uses standard programming and/or engineering technologies. The term "product" used in this application covers a computer program that can be accessed from any computer readable component, carrier or medium. For example, the computer readable medium may include but is not limited to: a magnetic storage component (for example, a hard disk, a floppy disk, or a magnetic tape), an optical disc (for example, a compact disc (Compact Disk, CD), a digital versatile disc (Digital Versatile Disk, DVD), a smart card and a flash memory component (for example, an erasable programmable read-only memory (Erasable Programmable Read-Only Memory, EPROM), a card, a stick, or a key drive). In addition, various storage media described in this specification may indicate one or more devices and/or other machine-readable media that are used to store information. The term "machine-readable media" may include but is not limited to a radio channel, and various other media that can store, contain and/or carry an instruction and/or data.

With rapid development of communications technologies, an Internet of Things (Internet of Things, IoT) technology gains more attention from the industry. Different from a mobile broadband (Mobile Broad Band, MBB) service, a main service scenario of an IoT is massive machine type communication (Machine-Type Communications, MTC) and/or high-reliability machine type communication. Main features of massive MTC are massive connections, small data packets, low costs, and the like. Therefore, an IoT service becomes one of main services supported by a cellular mobile communications system.

Usually, uplink user status information is multiplexed and transmitted on a time-frequency resource shared by systems, and may be used in a plurality of scenarios. For example, the uplink user status information may be used for a random access signal (specifically, such as a preamble (Preamble)) in a random access process in an existing Long Term Evolution (Long Term Evolution, LTE) protocol, may be used for a UDRS before uplink data transmission, or may be used for a demodulation reference signal (Demodulation Reference Signal, DMRS). FIG. 1 is a schematic diagram of a communication scenario according to an embodiment of this application. In these scenarios, a user selects a user sequence from a particular quantity of user sequence sets, and transmits the user sequence. The user sequence mainly plays a role in identifying the user. A base station detects the user sequence sent by the user, that is, performs a user detection process, and may also perform channel estimation or time-frequency offset estimation based on the user sequence.

If two users happen to simultaneously select and send a same user sequence, the base station considers that the user sequence is corresponding to only one access user. This case is referred to as a collision. As shown in FIG. 1, two users simultaneously select a user sequence 7, and the two users collide. Usually, a collision causes a failure of subsequent data transmission, and has a great impact on performance of a communications system. A set of user sequences that can be selected by a user is referred to as a user sequence space, and a size of the user sequence space directly determines a probability of a collision between users. A larger user sequence space indicates a smaller collision probability. User sequences in an existing user sequence space are mutually orthogonal, and a size of the user sequence space is limited by a length of the user sequence.

A conventional cellular mobile communications system is mainly designed for the MBB service without considering a massive connection scenario. In the MBB service, a quantity of access users and a quantity of potential access users both are relatively limited. Therefore, when a user sequence space is designed for the system, only a relatively small and fixed total quantity of available user sequences are provided. For example, on a physical random access channel (Physical Random Access Channel, PRACH) in an LTE system, only 54 Zadoff-Chu (ZC) sequences are provided for contention-based access.

In the massive connection scenario of the IoT service, because a quantity of connections and a quantity of access users are large, if a size of a user sequence set is designed the same as that designed for MBB, a probability that a collision occurs is greatly increased, that is, a conflict probability is greatly increased. To decrease a collision probability in a random access process, in an existing solution, time-frequency resources occupied by a user sequence are increased (that is, a length of the user sequence is increased) to increase a quantity of supported user sequences. However, increasing the length of the user sequence causes reduction of time-frequency resources used for uplink data transmission, and this is disadvantageous to the massive connections and small packet transmission of the IoT service. In addition, increasing the length of the user sequence causes complexity of demodulating the user sequence by the base station, causing a delay increase.

User sequences are widely used in scenarios of a wireless terminal such as a radio access process, channel estimation, time offset estimation, and frequency offset estimation. In these applications, for example, a first step of the random access process is usually user detection (or referred to as user identification). A plurality of users respectively send, on a shared time-frequency resource, user sequences identifying the users, and signals sent by different users are superposed over the air. The base station receives these superposed signals, to determine wireless terminals that currently request access. In the existing solution, a user sequence in user sequence space is designed to have orthogonality. In this way, even though signals sent by users are superposed in the base station, the base station can separate, by using the orthogonality of the user sequence, the signals sent by the users, to achieve user detection.

To support a lower access delay, a user expects that no coordinated scheduling needs to be performed before performing access, that is, expects to perform scheduling-free (Grant-free) communication. In this case, the user randomly selects a user sequence from a user sequence space as a sending sequence of the user. Herein, the user sequence space is corresponding to the user sequence set, the set of selectable user sequences, and the like in the foregoing description.

In the existing solution, a Zadoff-Chu (ZC) is mainly used as a user sequence, and a plurality of ZC sequences are used to form a user sequence space. The ZC sequence can better meet orthogonality required for user detection. Different ZC sequences in the user sequence space are generated by performing cyclic shifting on one base sequence, and one base sequence is generated by using one root index. A base sequence with a length of N may have N cyclic shifts, so as to generate N ZC sequences. N ZC sequences generated by performing cyclic shifting on a same root sequence meet a perfect orthogonal characteristic, that is, a degree of coherence between any two of the N ZC sequences is 0. Therefore, as a user sequence, the ZC sequence has better user detection performance, and is widely used in a communications system such as an LTE system.

The fifth generation mobile communication under study should have characteristics such as a high throughput, a low delay, and a large quantity of connections. The large quantity of connections is proposed for a requirement of massive terminal connections in the IoT service. In this case, user detection designs in an existing protocol and the existing solution mainly have the following several problems.

(1) A user sequence space is small. A base sequence with a length of N usually supports a maximum of N different user sequences. In this case, if a quantity of users who perform access simultaneously is relatively large, a "collision" is generated when the users randomly select respective sequences, that is, two or more users select a same user sequence. Table 1 shows collision probabilities in cases of user sequence spaces of different sizes and different quantity of access users. It may be seen that in a case of a same quantity of access users, a larger user sequence space indicates a lower user collision probability.

TABLE 1

Relationship existing between a collision probability and each of a size of a user sequence space and a quantity of access users when a user sequence is randomly selected

| Size of a user sequence space | Quantity of access users | | |
|---|---|---|---|
| | 4 | 6 | 8 |
| | Collision probability | | |
| 32 | 0.0909 | 0.1468 | 0.2657 |
| 64 | 0.0461 | 0.0757 | 0.1044 |
| 128 | 0.0233 | 0.0385 | 0.0534 |
| 256 | 0.0117 | 0.0194 | 0.0270 |

(2) A user sequence space does not support flexible extension. In an existing LTE system, once a user sequence length is determined, a size of a corresponding user sequence space is correspondingly determined. When a quantity of access users is extremely small, time-frequency resources are wasted if a relatively large user sequence space (corresponding to a relatively large user sequence length) is used; or when a quantity of access users is extremely large, a collision probability is high if a relatively small user sequence space is used. Such a design is lack of flexibility.

(3) Detection complexity is high. To perform ZC sequence correlation detection, all user sequences in a user sequence space need to be associated with each other, and complexity is the square of a user sequence length N. When N is relatively large, real-time detection causes relatively high computing overheads.

Based on the foregoing problems existing in the existing solution, the embodiments of this application provide a user sequence transmission method. The method includes the following: A network device sends first signaling to a terminal device, and correspondingly, the terminal device receives the first signaling sent by the network device. The first signaling includes first information indicating a quantity of user sequences in a first user sequence space, and the user sequences in the first user sequence space include a universal set of user sequences used by the terminal device served by the network device. The network device receives a first user sequence sent by the terminal device based on the first information, and correspondingly, the terminal device sends the first user sequence to the network device based on the first information. The network device performs user detection and/or communication parameter estimation based on the first user sequence.

It should be noted that the network device in the embodiments of this application may be a network device in a cell, or may be a base station in a cell sense or a network device having a function similar to that of a base station, for example, a wireless router and a radio access point. The network device may be a network device that provides wireless access and communication services for a mobile or fixed terminal device in a cell. All terminal devices served by the network device include a terminal device that accesses the network device, a terminal device that camps on the network device, and the like; or include a terminal device that accesses the network device, a terminal device that performs uplink/downlink communication by using the network device, a terminal device that camps on a serving area of the network device and that may perform access or uplink/downlink communication, and the like. The serving area of the network device may be an area covered by an air interface of the network device.

The user sequences in the first user sequence space include the universal set of user sequences used by the terminal device served by the network device. Alternatively, it may be described as follows: The user sequences in the first user sequence space include all user sequences used by the terminal device served by the network device, or the user sequences in the first user sequence space include a union set of user sequences used by all the terminal devices served by the network device.

It should be understood that in the existing solution, the quantity of user sequences in the first user sequence space (also referred to as a size of the user sequence space) is determined in a protocol, or is at least negotiated by the network device (for example, a base station) and the terminal device (for example, user equipment (User Equipment, UE)) during system initialization and keeps unchanged. Therefore, in the existing solution, the network device does not send the first signaling to the terminal device, to indicate the quantity of user sequences in the first user sequence space by using the first signaling.

In the user sequence transmission method provided in the embodiments of this application, the network device sends, to the terminal device, the first information indicating the quantity of user sequences in the first user sequence space, and the user sequences in the first user sequence space include the universal set of user sequences used by the terminal device served by the network device. Therefore, a size of a user sequence space that can be used by all the terminal devices served by the network device may be flexibly specified, so as to support size adjustment for the user sequence space, thereby improving accuracy of user detection or communication parameter estimation, and improving work efficiency of a system.

It should be understood that the user sequences in the first user sequence space include the universal set of user sequences used by the terminal device served by the network device. Alternatively, it may be described as follows: The user sequences in the first user sequence space include all the user sequences used by the terminal device served by the network device, or the user sequences in the first user sequence space include the union set of user sequences used by all the terminal devices served by the network device.

The universal set of user sequences used by the terminal device served by the network device may include a user sequence used for contention-based access and/or a user sequence for non-contention-based access; or in other words, the first user sequence space may include a user sequence used by the terminal device for contention-based access and/or a user sequence used by the terminal device for non-contention-based access.

Alternatively, the universal set of user sequences used by the terminal device served by the network device may include a user sequence used for scheduling-free based access and/or a user sequence used for access that is based on scheduling performed by the network device; or in other words, the user sequences in the first user sequence space include a user sequence used for scheduling-free based access and/or a user sequence used for access that is based on scheduling performed by the network device.

Alternatively, the universal set of user sequences used by the terminal device served by the network device may include a user sequence used for autonomous (autonomous) access and/or a user sequence used for access that is supervised (supervised) by the network device; or in other words, the user sequences in the first user sequence space include a user sequence used for autonomous (autonomous) access and/or a user sequence used for access that is supervised (supervised) by the network device.

In some scenarios, for example, in a grant-free communication scenario, the first user sequence space may include only a user sequence used for contention-based access (access based on scheduling performed by the network device or access supervised by the network device). In some scenarios, for example, in a scenario of communication scheduled by a base station, the first user sequence space may include only a user sequence used for non-contention-based access (scheduling-free based access or autonomous access). In some scenarios, the first user sequence space may include both a user sequence used for contention-based access and a user sequence used for non-contention-based access.

It should be noted that in the embodiments of this application, a degree of coherence between any two user sequences in the first user sequence space is greater than or equal to 0 and less than or equal to a first threshold. When the degree of coherence between any two user sequences in the first user sequence space is equal to 0, the first user sequence space is completely orthogonal, that is, any two user sequences in the first user sequence space are orthogonal.

To resolve a problem that user sequences are prone to collide in massive connections, user sequences in a used user sequence space may be quasi-orthogonal, that is, not completely orthogonal.

In this case, the user sequences in the first user sequence space may be quasi-orthogonal, and the "quasi-orthogonal"

means that the degree of coherence between any two user sequences in the first user sequence space is greater than or equal to 0 and less than or equal to the first threshold, and that a degree of coherence between at least one pair of user sequences in the first user sequence space is greater than 0.

Specifically, as described above, a user sequence length affects a size of a time-frequency resource used by a system to perform uplink data transmission. Therefore, in the embodiments of this application, a quasi-orthogonal code (for example, a quasi-orthogonal Reed-Muller sequence) may be used as a user sequence while a user sequence length N in the existing solution keeps unchanged (that is, compared with the solution in the prior art, no additional time-frequency resource needs to be allocated). A size of a quasi-orthogonal user sequence is not limited to a fixed size of an orthogonal user sequence space, and therefore a large sequence space may be generated.

A size of a user sequence space (which is referred to as a user space or a sequence space for short) is a total quantity of different user sequences in a set of user sequences that can be used by a user. In other words, the size of the user sequence space is a quantity of all user sequences included in the user sequence space. This is different from a quantity of sequences in a group configured on a random access channel (Random Access Channel, RACH) in an existing LTE protocol.

"Quasi-orthogonal" means that a degree of coherence between any two user sequences in the user sequence space is greater than or equal to 0 and less than or equal to a threshold ε, and that a degree of coherence between at least one pair of user sequences in the user sequence space is greater than 0. In the embodiments of this application, user sequences are allowed to be incompletely orthogonal, but orthogonality of the user sequence space should be maintained to a maximum extent. It should be noted that the user sequence space may include an orthogonal sub user sequence space. A degree of coherence between user sequences $s_1$ and $s_2$ with a length of N may be defined as follows:

$$C_{s_1,s_2} = \frac{\left|\sum_{i=1}^{N} s_1(i)\overline{s_2(i)}\right|}{\sqrt{\left|\sum_{i=1}^{N} s_1(i)\overline{s_1(i)}\right|\left|\sum_{i=1}^{N} s_2(i)\overline{s_2(i)}\right|}},$$

where s(i) is an $i^{th}$ bit in a sequence.

Setting of the first threshold ε is determined based on a system parameter, for example, may be determined based on a user sequence length N. Specifically, a value of the first threshold ε may be $$\varepsilon = 1 \Big/ N^{\frac{1}{2} - \frac{1}{\sqrt{N}}}.$$

In the method in the embodiments of this application, when a quasi-orthogonal user sequence space is used, a user sequence space is extended, a collision probability between users may be decreased, and no additional time-frequency resource needs to be allocated while a user sequence length keeps unchanged.

Another user sequence transmission method in the embodiments of this application may include: sending, by a network device, first signaling to a terminal device, where the first signaling includes first information indicating orthogonality of a first user sequence space; receiving, by the network device, a first user sequence sent by the terminal device based on the orthogonality of the first user sequence space; and performing, by the network device, user detection and/or communication parameter estimation based on the first user sequence.

Compared with the foregoing solution, in this solution, the network device notifies the terminal device of the orthogonality of the first user sequence space instead of a quantity of user sequences. In this manner, the network device and the terminal device may also mutually determine a size of a user sequence space that needs to be used.

The first information indicating the orthogonality of the first user sequence space may be a maximum value of a degree of coherence between any two user sequences in the first user sequence space, or may be a space level of the first user sequence space. The space level is a quantity of values of a maximum coherence degree of a subspace that can be obtained by dividing the first user sequence space.

A principle of extending user sequence space by using a quasi-orthogonal user sequence is described below in detail.

If only an orthogonal user sequence space is used, a user sequence space with a maximum size of N can be generated by using a user sequence with a length of N, and a quantity of supported users is limited. However, when a quasi-orthogonal user sequence space is used, that is, user sequences in the user sequence space are incompletely orthogonal, the quantity of supported users may be greatly increased, thereby decreasing a collision probability. Table 2 shows a level of a user sequence space, a size of a user sequence space, a user sequence meeting a requirement, and a maximum degree of coherence between user sequences. As shown in Table 2, a user sequence space with a size much greater than N may be generated by using a quasi-orthogonal user sequence with a length of N.

TABLE 2

Example of a user sequence space

| Level of a user sequence space | Size of a user sequence space | User sequence meeting a requirement | Maximum degree of coherence (Coherence) between user sequences |
|---|---|---|---|
| Level 1 | N | RM sequence constructed by a using a single generator matrix P ZC sequence corresponding to a single root index | 0 |
| Level 2 | $N^2$ | RM sequence constructed by using all matrices P in a Kerdock set ZC sequences corresponding to all root indexes | $1/\sqrt{N}$ |
| Level 3 | $N^3$ | RM sequence constructed by using all matrices P in a DG (m, 1) set | $1/N^{\frac{1}{2}-\frac{1}{m}}$ |
| ... | ... | ... | ... |
| Level r + 2 | $N^{r+2}$ | RM sequence constructed by using all matrices P in a DG (m, r) set | $1/N^{\frac{1}{2}-\frac{r}{m}}$ |

The Kerdock set, the DG(m, 1) set, and the DG(m, r) set all are parameters used to construct the RM sequence. A full name of a DG set is a Delsarte-Goethals set, and m is a parameter related to a sequence length of a user. A user sequence space at the level 1 is an orthogonal user sequence space, and a user sequence space at the level 2 and a user sequence space at a level higher than the level 2 are quasi-orthogonal user sequence spaces. A level of a user sequence space gradually increases from the level 1 to the level r+2, and a user sequence space at a high level includes a user sequence space at a low level.

Figure 2:
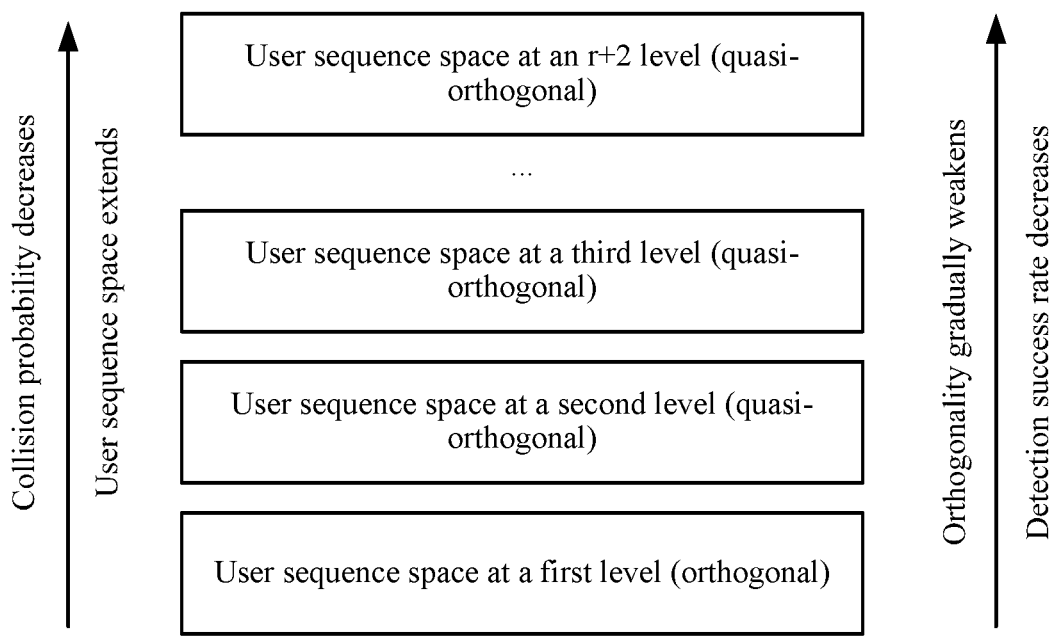
FIG. 2 is a schematic diagram of a space level of a user sequence space according to an embodiment of this application.

As shown in Table 2, with extension of a user sequence space, although a collision probability is greatly decreased, orthogonality between users is getting worse, that is, interference between the users is increasingly large (this is represented by an increase in a degree of coherence between user sequences). Accuracy of user detection based on orthogonality described above may be reduced due to introduction of incompletely orthogonal user sequences. FIG. 2 is a schematic diagram of a space level of a user sequence space according to an embodiment of this application. As shown in FIG. 2, a larger space level of a user sequence space indicates a lower collision probability, lower orthogonality between user sequences in the user sequence space, and a low user detection success rate. Therefore, in this embodiment of this application, a compromise may be made on massive connections (a low collision probability) and high reliability (a high detection success rate), provided that a large user sequence space is obtained.

In this embodiment of this application, the network device may determine the quantity of user sequences in the first user sequence space based on current network load and a current system parameter. The system parameter includes at least one of a user sequence length, a collision probability tolerance value, a detection omission probability tolerance value, a timing estimation error, a channel estimation error, a bit error rate, a size of an available time-frequency resource, a size of an available computing resource, signal received power, and a signal-to-noise ratio.

Specifically, an example in which a common network device is a base station is used for description. The base station may determine a quantity of user sequences in a user sequence space by using an algorithm. Input of the algorithm includes a quantity k of access users (for example, an average quantity of access users or a current quantity of access users), and a user sequence length N. A system performance parameter may include at least one of the following parameters but is not limited to:

a collision probability tolerance value $p_{max}^{col}$ a detection omission probability tolerance value $p_{max}^{miss}$ a size of an available time-frequency resource (such as a RACH)

a size of an available computing resource (for example, a hardware resource used for computing and an algorithm that can be borne by a hardware resource at a transmit end and/or a receive end)

signal received power a signal to interference plus noise ratio (Signal to Interference plus Noise Ratio, SINR) or another parameter for measuring receiving channel quality a timing estimation error a channel estimation error a bit error rate or a block error rate a system parameter related to size selection for a user sequence space . . . .

Output of the algorithm may include at least one of the following but is not limited to:

a size C of a user sequence space, that is, a quantity of user sequences in the user sequence space a user sequence type (an RM sequence, a ZC sequence, or the like)

a level L of a user sequence space

In a specific example, to optimize overall system performance, the system performance parameter is determined by a specific application scenario. For example, when an application scenario of a user sequence is blind detection for user random access, assuming that detection algorithm performance is ideal, the quantity k of access users, the user sequence length N, and the collision probability tolerance value $p_{max}^{col}$ are necessary input parameters. A size of a user sequence space may be determined in the following manner:

When k users perform random access in a user sequence space with a size of C, a collision probability is:

$$p^{col}(k, C) = C \sum_{i=2}^{k} \left( iC_k^i \left(\frac{1}{C}\right)^i \left(\frac{C-1}{C}\right)^{k-i} \right)$$

Therefore, the size C of the user sequence space should meet the following formula:

$p^{col}(k,C) \leq p_{max}^{col}$

Generally, in addition to collision performance, detection performance, namely, a detection omission probability, further needs to be considered. Because a larger user sequence length N indicates low interference (degree of coherence) between user sequences, the detection omission probability is related to the user sequence length N. The detection omission probability is a function of a signal-to-noise ratio (Signal Noise Ratio, SNR):

$p^{miss}(k,N,C,\text{SNR}) = Q(\text{SINR})$

Q( ) is a Q function. The Q function is also referred to as an error function, and is a general function used to estimate detection performance during signal processing; $\text{SINR} = f_{alg}(k, N, C, \text{SNR})$ is the signal to interference plus noise ratio, where $f_{alg}$ is related to a detection algorithm; the SINR is directly proportional to the quantity k of access users; N and C jointly determine a value of interference between any two users; and the SNR determines a noise value.

Therefore, the size C of the user sequence space should meet the following formula:

$p^{miss}(k,N,C,\text{SNR}) \leq p_{max}^{miss}$

Based on different application scenarios, the network device determines the quantity of user sequences in the first user sequence space based on the current network load and the current system parameter, so as to more accurately determine a size of the first user sequence space. Therefore, the size of the user sequence space is more helpful in improving accuracy of user detection or communication parameter estimation, and improving work efficiency of a system.

In this embodiment of this application, an optimal size of a user sequence space may be jointly determined by comprehensively considering a plurality of factors such as actual detection algorithm performance (which is jointly determined by a size of a user sequence space, a signal-to-noise ratio, and the like), and an available computing resource or algorithm complexity (the algorithm complexity is increased with extension of a user sequence space). Alternatively, the network device may determine a size of a user sequence space by setting a condition. For example, a condition may be preset in the network device based on experience, and the condition may be related to network load or another system parameter. When the network load or the another system parameter meets the condition, the size of the user sequence space is determined as a corresponding value. An interface may further be disposed on the network device, so that a network manager can set a size of a user sequence space by using the interface. Alternatively, a size of a user sequence space may be stored on the network device after being obtained through manual division. A specific manner of determining a size of a user sequence space is not limited in the embodiments of this application.

It is proved by experiments that when a user sequence space is sharply extended compared with that in the existing solution through a proper design (for example, the space is extended by 120 times by using a sequence with a length of 128), only detection performance is slightly lost but a probability of a collision between users is greatly decreased.

Then, the base station notifies UE of the size of the first user sequence space based on a requirement, or instructs UE to extend or reduce the user sequence space in real time, and may further notify the UE of a level of the user sequence space, a user sequence type, and the like. The UE sends the first user sequence to the base station based on the quantity of user sequences in the first user sequence space. The first user sequence is a user sequence in the first user sequence space. The base station performs user detection and/or communication parameter estimation based on the first user sequence.

Figure 3:
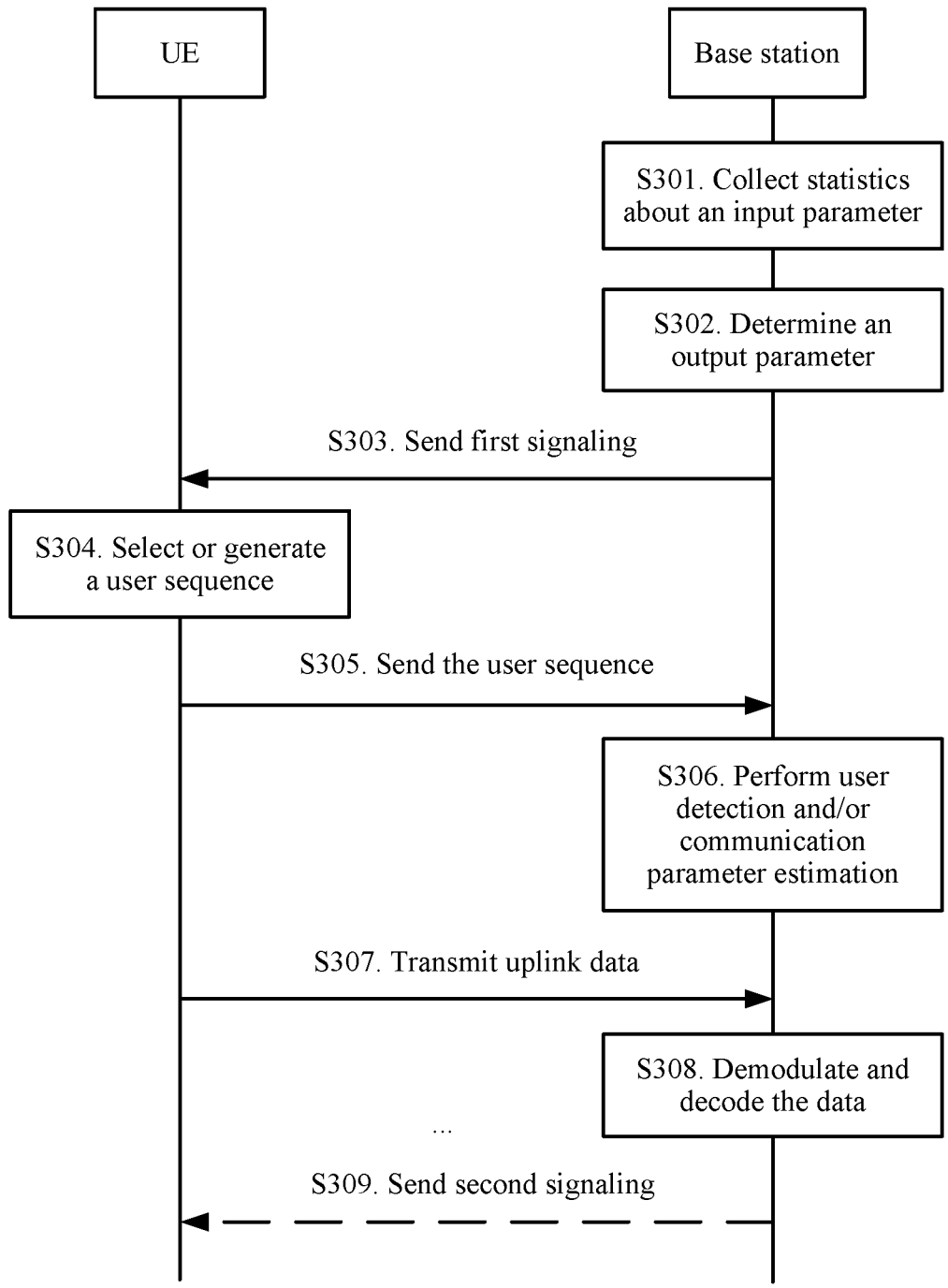
FIG. 3 is a schematic flowchart of a user sequence transmission method according to an embodiment of this application.

There may be a plurality of forms used by the base station to notify the UE of a size of a user sequence space by sending the first signaling to the UE, and used by the UE to send a user sequence to the base station based on the first signaling. One form is a semi-static form. Specifically, FIG. 3 is a schematic flowchart of a user sequence transmission method according to an embodiment of this application. Steps of the method may be shown in FIG. 3.

S301. The base station collects statistics about an input parameter. Specifically, the base station may collect statistics about network load and a system parameter within a period. For example, the system parameter may include input parameters such as a quantity of access users, a system performance parameter, and a user sequence length. Optionally, the period may be a broadcast period.

S302. The base station determines an output parameter. Specifically, the base station determines a size of a current user sequence space, and may further determine a user sequence type.

S303. The base station sends, to all UEs, first signaling that includes information about the output parameter. Optionally, the base station may send the first signaling through broadcast. Correspondingly, the UE receives the first signaling sent by the network device. Specifically, for a random access process, the base station may add the information to a system information block (System Information Blocks, SIB) SIB2 similar to that stipulated in 36.331 in an LTE protocol. For a pilot sequence, a synchronization sequence, or a demodulation reference signal, additional signaling needs to be added or the existing signaling needs to be multiplexed. A specific form and content of the first signaling are described below in detail.

The SIB2 in the random access process may carry the following information:

```
PRACH-ConfigInfo ::= SEQUENCE {
...
prach-IndexOfSequenceSpaceUsed
prach-NumOfSequenceSpaceUsed
prach-LevelOfSequenceSpaceUsed
Prach-TypeOfSequenceUsed
...
}
```

S304. The UE randomly selects or generates a user sequence in the specified user sequence space based on the first signaling sent by the base station.

Specifically, the UE may select or generate a user sequence in two methods.

In one method, all user sequences in a maximum user sequence space that may be used by a system are generated in an offline manner, and are stored in the UE. When using the method, the UE selects, based on an indicated size of a user sequence space, a user sequence in a corresponding user sequence subspace, and sends the user sequence to the base station.

In the other method, a user sequence is generated in an online manner. When using the method, the UE directly generates a user sequence in a specified user sequence space based on an indicated size of a user sequence space by using a calculation method, and generates an uplink signal by using the user sequence. Correspondingly, That the UE sends a first user sequence to the network device based on a quantity of user sequences in the first user sequence space may include: generating, based on the quantity of user sequences in the first user sequence space, the first user sequence belonging to the first user sequence space, and sending the first user sequence to the network device.

S305. The UE sends the user sequence to the base station, and correspondingly, the base station receives the user sequence sent by the UE.

S306. The base station performs user detection and/or communication parameter estimation based on the user sequence.

S307. The UE transmits uplink data, and correspondingly, the base station receives the data sent by the UE.

S308. The base station demodulates and decodes the data.

Another form is an adaptive adjustment form, and a difference between the adaptive adjustment form and the semi-static form lies in the following: When a size of a user sequence space is determined based on a system parameter, the UE is not notified of the size of the user sequence space periodically, and instead, the UE is notified of the size of the user sequence space when the size of the user sequence space changes or a change of the size is greater than a preset threshold. Therefore, when the system parameter keeps unchanged for a long time or a change of the system parameter is less than a preset threshold, the first signaling is not sent to the UE, to reduce signaling overheads.

It should be understood that in this embodiment of this application, the system may configure a specific user sequence for each selectable user sequence space size, so that the network device and a terminal device know user sequences included in a user sequence space corresponding to the user sequence space size. The configuration may be pre-stored in the system. For example, user sequence spaces with various sizes and user sequences included in the user sequence spaces may be stored in the network device and the terminal device in a list manner; or a user sequence may be stored for each user sequence space in user sequence spaces with various sizes, and another user sequence in the user sequence space is calculated based on this user sequence. Alternatively, the configuration may be notified by using signaling. For example, the network device notifies, by using the signaling, the terminal device of user sequences corresponding to user sequence spaces with various sizes. This is not limited in this embodiment of this application.

Figure 4:
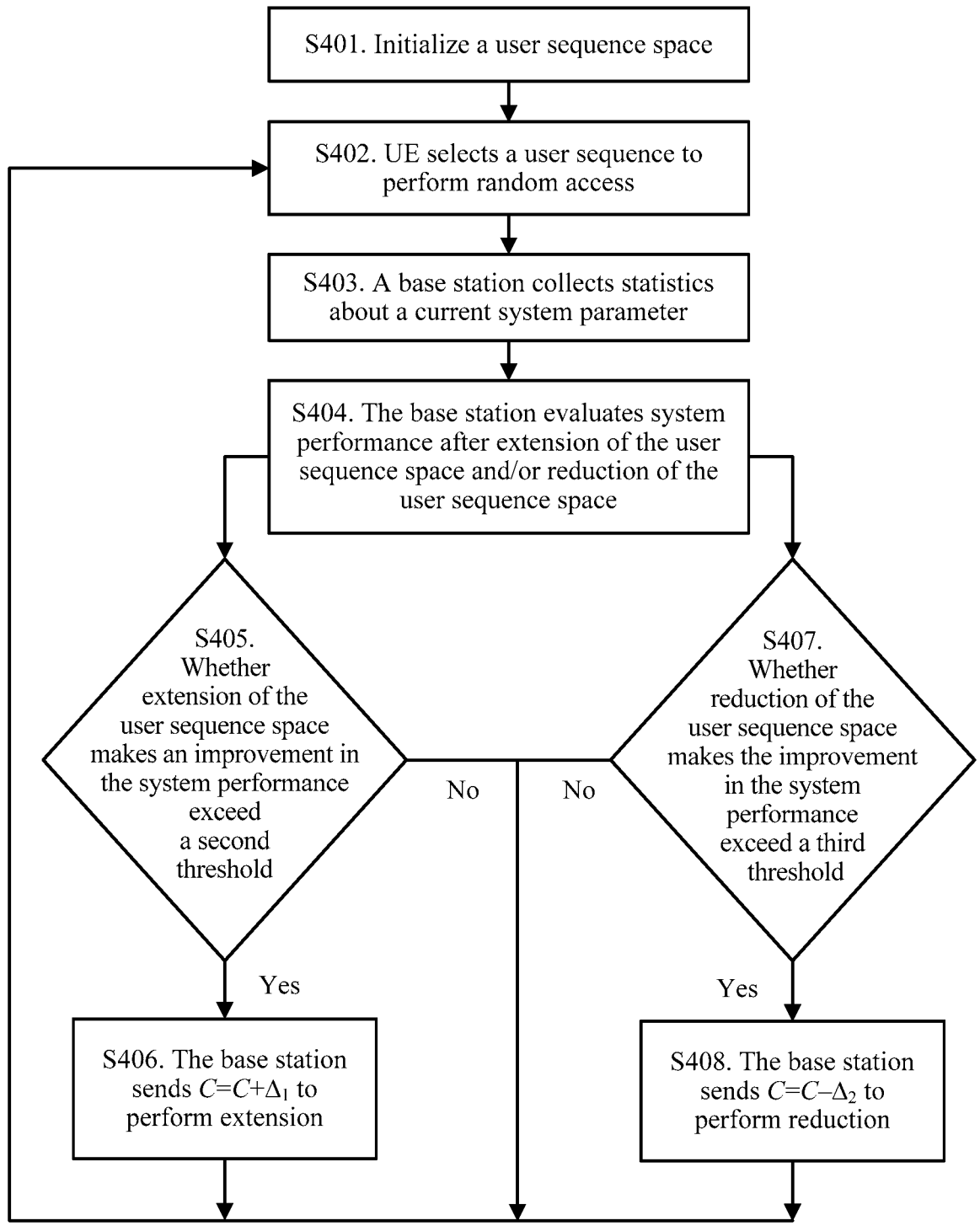
FIG. 4 is a schematic flowchart of a user sequence transmission method according to another embodiment of this application.

FIG. 4 is a schematic flowchart of a user sequence transmission method according to an embodiment of this application. A procedure of a specific example of the foregoing case is provided with reference to FIG. 4.

S401. Initialize a user sequence space for a system, and a size of the initialized user sequence space is $C=C_0$.

S402. UE selects a user sequence in the user sequence space to perform random access.

S403. A base station collects statistics about a current system parameter. For example, the system parameter may include a quantity of access users, a signal-to-noise ratio, a detection omission probability, and a collision probability.

S404. The base station evaluates, based on the system parameter, system performance after extension of the user sequence space and/or reduction of the user sequence space. The system performance after extension of the user sequence space and/or reduction of the user sequence space may be evaluated by using an analytic method or a statistical method.

The analytic method is to estimate, based on a mathematical formula, system performance required for optimization, and select a size of a user sequence space that makes the system perform better. For example, when a current application scenario is random access, a user collision and user detection omission both cause an access failure. Therefore, access performance $p^{failure}=p^{col}+p^{miss}$ after extension of the user sequence space and/or reduction of the user sequence space may be evaluated. Herein, access performance is represented by an access failure probability parameter $p^{failure}$, and $p^{failure}$ is the sum of a collision probability parameter $p^{col}$ and a detection omission probability $p^{miss}$, where $$p^{miss} = Q(SINR) = Q(f_{alg}(k, N, C, SNR)),$$

$$p^{col}(k, C) = C \sum_{i=2}^{k} \left( i C_k^i \left(\frac{1}{C}\right)^i \left(\frac{C-1}{C}\right)^{k-i} \right).$$

The statistical method is to find and compare, based on historical system performance statistics, system performance corresponding to sizes of different user sequence spaces when similar input parameters are entered, and select a size of a user sequence space that makes the system performance better.

S405. Determine, based on an evaluation result, whether extension of the user sequence space can make an improvement in the system performance exceed a second threshold; and perform S406 if extension of the user sequence space can make the improvement in the system performance exceed the second threshold; or keep the user sequence space unchanged and perform S402 if extension of the user sequence space cannot make the improvement in the system performance exceed the second threshold.

S406. The base station increases the size of the user sequence space to $C=C+\Delta_1$, and sends signaling to the UE, where the signaling includes at least information indicating a quantity of user sequences in a new user sequence space. Optionally, the base station may send the signaling through broadcast.

S407. Determine, based on the evaluation result, whether reduction of the user sequence space can make the improvement in the system performance exceed a third threshold; and perform S408 if reduction of the user sequence space can make the improvement in the system performance exceed the third threshold; or keep the user sequence space unchanged and perform S402 if reduction of the user sequence space cannot make the improvement in the system performance exceed the second threshold. It should be understood that an execution order of S405 and S407 is not limited.

S408. The base station decreases the size of the user sequence space to $C=C-\Delta_2$, and sends signaling to the UE, where the signaling includes at least information indicating a quantity of user sequences in a new user sequence space. Optionally, the base station may send the signaling through broadcast.

It should be understood that, in this embodiment of this application, optionally, a network device may send first signaling to a terminal device through broadcast. Correspondingly, the terminal device receives the first signaling sent by the network device through broadcast. Certainly, the network device and the terminal device may also transmit signaling to each other in another manner, for example, in a unicast manner or a multicast manner. This is not limited in this embodiment of this application.

It should be further understood that this embodiment of this application may be applied to a massive access scenario of an IoT service. In this case, the size C of the user sequence space may be an extremely large value, and consequently, first information in the first signaling sent by the base station to the UE causes relatively large signaling resource overheads. In this embodiment of this application, a method in which a size of a user sequence space is quantified by using a bit and a quantized value is sent may be used. Correspondingly, the first information includes a space level of the first user sequence space, or a quantized value indicating a quantity of user sequences in the first user sequence space. The first information may further include a corresponding quantity of user sequences per quantized value, and the quantity of user sequences is referred to as a granularity for short. Certainly, the corresponding quantity of user sequences (the granularity) per unit quantized value may also be agreed on by using a system or a protocol. This is not limited in this embodiment of this application.

Specifically, when the quantity of user sequences in the first user sequence space is all user sequences in a user sequence space at a level, the first information may be a level L of the first user sequence space. A quantity of available sequences included in the space at the L level is $N^L$, and therefore a relatively small L may indicate an extremely large space range. Only a few bits may be used, thereby greatly reducing signaling overheads.

In another case, when L increases, a quantity of user sequences included a user sequence space at each level may increase exponentially. Therefore, in some application scenarios, a granularity required for accurately adjusting and controlling a size of the user sequence space may be unable to be provided, that is, the quantity of user sequences in the first user sequence space is some user sequences in a user sequence space at a level. In this case, the quantity of user sequences in the user sequence space at each level may be further quantized, as shown in the following Table 3.

TABLE 3

Method for quantizing a size of a user sequence space

| Level of a user sequence space | Size of the user sequence space | Quantized value | Quantity of bits corresponding to the quantized value | Granularity |
|---|---|---|---|---|
| 1 | $C \leq N$ | $\lfloor C/\text{granularity} \rfloor$ | $\log_2 N$ | 1 |
| 2 | $N \leq C \leq N^2$ | $\lfloor C/\text{granularity} \rfloor$ | $\log_2 N$ | $N$ |
| 3 | $N^2 \leq C \leq N^3$ | $\lfloor C/\text{granularity} \rfloor$ | $\log_2 N$ | $N^2$ |
| ... | ... | ... | ... | ... |

TABLE 4

Configuration scheme of a size of a user sequence space

| Length N of user sequence | Channel quality indicator index (Channel Quality Indicator Index, CQI Index) | Transmission mode index (Transmission Mode Index, TM Index) | Quantity of access users | Index of a configuration of a user sequence space |
|---|---|---|---|---|
| 32 | 1 | 1 | 1 to 10 | 1 |
| 64 | 3 | 2 | 10 to 20 | 3 |
| 128 | 5 | 6 | 30 to 50 | 5 |
| ... | | | | |

In some application scenarios in which a terminal device (a user) always keeps in a wakeup state, for example, in an enhanced mobile broadband (enhanced Mobile Broadband, eMBB) technology or a 5G (ultra-Reliable and Low-Latency Communications, uRLLC) technology, signaling may be sent only when a configuration of a user sequence space changes, to reduce signaling overheads. A case in which the signaling includes a size of a user sequence space is used as an example. When the terminal device performs first access, the base station sends $C_0$ by using downlink signaling, to indicate a user space used when the terminal device performs access. After the first access, the base station sends, by using broadcast signaling, $C_A$ to notify the terminal device of the change. If a size configuration of the user sequence space keeps unchanged, the base station does not repeatedly broadcast the signaling. The foregoing signaling indication manner based on a size change of a user sequence space is also applicable to an indication of a user sequence type, a space level of a user sequence space, and the like. A specific indication manner in this embodiment of this application may be stipulated in a standard.

In this embodiment of this application, the base station may determine, through calculation, a size of a currently used user sequence space. To unify and simplify an operation manner, the base station may also determine a size of a user sequence space by selecting a user sequence space from a plurality of preconfigured user sequence spaces. The plurality of preconfigured user sequence spaces may be stipulated in a form of a standard. In the standard, a correspondence between a configuration of a user sequence space and an index may be established. The configuration of the user sequence space includes a quantity of user sequences in the user sequence space, and may further include at least one of a type of the user sequence in the user sequence space, a space level of the user sequence space, and a length of the user sequence in the user sequence space.

Correspondingly, the first information may be an index indicating a configuration of the first user sequence space, the index is agreed on in advance in the network device and the terminal device by using a standard, and the configuration of the first user sequence space includes the quantity of user sequences in the first user sequence space. The configuration of the first user sequence space may further include at least one of a type of the user sequence in the first user sequence space, a space level of the first user sequence space, and a length of the user sequence in the first user sequence space.

In a specific example, a configuration scheme, shown in Table 4, of a size of a user sequence space may be listed.

The index of the configuration of the user sequence space may be referred to as a user sequence index (User Sequence Index, USI) for short. The configuration of the user sequence space includes a quantity of user sequences in the user sequence space, and may further include at least one of a type of the user sequence in the user sequence space, a space level of the user sequence space, and a length of the user sequence in the user sequence space. Optionally, signaling resources may be reduced by using an index to indicate a quantity of user sequences in a user sequence space, a user sequence type, a space level of the user sequence space, and a user sequence length.

In a specific example, content indicated by the user sequence index may be shown in Table 5. All content in Table 5 may also be stipulated outside a standard, for example, the content may be notified by using signaling and the like. This is not limited in this embodiment of this application.

TABLE 5

Content (which may be agreed on by a standard) indicated by a user sequence index

| User sequence index (USI) | User sequence type | Space level of a user sequence space | Quantity of user sequences | User sequence length |
|---|---|---|---|---|
| 1 | ZC sequence | 1 | 64 | 64 |
| 2 | ZC sequence | 2 | 128 | 64 |
| 3 | RM sequence | 2 | 1024 | 64 |
| 4 | RM sequence | 2 | 4096 | 64 |
| 5 | RM sequence | 3 | 32768 | 128 |
| ... | ... | ... | ... | ... |

Based on a requirement for performance in an application scenario, different quantities of user sequence indexes may be used in the standard, to control a user sequence space at different granularities. If a user sequence index list includes only two usage modes, the first signaling needs only 1 bit to indicate a user sequence index corresponding to a user sequence space selected by the base station. Alternatively, if a user sequence index list includes four usage modes, the first signaling needs 2 bits to indicate a user sequence index corresponding to a user sequence space selected by the base station. Alternatively, if a user sequence index list includes more than four usage modes, the first signaling needs at least 3 bits to indicate a user sequence index corresponding to a user sequence space selected by the base station. A quantity of bits required by the user sequence index may also be stipulated in the standard.

To reduce signaling overheads, the user sequence index may be sent in the foregoing described signaling indication manner based on a configuration change of a user sequence space, and details are not described herein again.

In this embodiment of this application, the space level, the quantized value, or the index is indicating a size of a user sequence space. When the first information is the space level, the quantized value, or the index, the first information can occupy an extremely small quantity of bits, so as to reduce signaling overheads and improve resource utilization.

It should be understood that when a quantized value represented by using a bit is used, the system needs to stipulate, by using a standard or signaling, the quantized value and a corresponding quantity of user sequences, namely a granularity, per quantized value, to uniformly understandings of a space size at a receive end and a transmit end. For example, as shown in FIG. 5, it may be stipulated that the first 3 bits indicate a granularity of a current space size value, and the latter 9 bits indicate a quantized value of a size of a user sequence space. Finally, the size C of the user sequence space is the quantized value of the size of the user sequence space×the granularity. For example, for a user sequence space C that meets $N^2 \leq C \leq N^3$, a level of the user sequence space is 3, a granularity is $N^2$, a quantized value is $\lfloor C/\text{granularity} \rfloor$, and a quantity of bits occupied by the quantized value is $\log_2 N$. Therefore, a relatively small quantity of bits may be indicating an extremely large dynamic range of a user sequence space. This is applicable to a massive connection scenario of the IoT service.

In this embodiment of this application, the type of the user sequence in the first user sequence space may be a Reed-Muller sequence (RM sequence) or a Zadoff-Chu sequence (ZC sequence). Certainly, this embodiment of this application is not limited thereto.

For a quasi-orthogonal user sequence space, when the system uses an RM sequence, the user sequences in the first user sequence space include a Reed-Muller sequence generated based on the at least two generator matrices.

Figure 6:
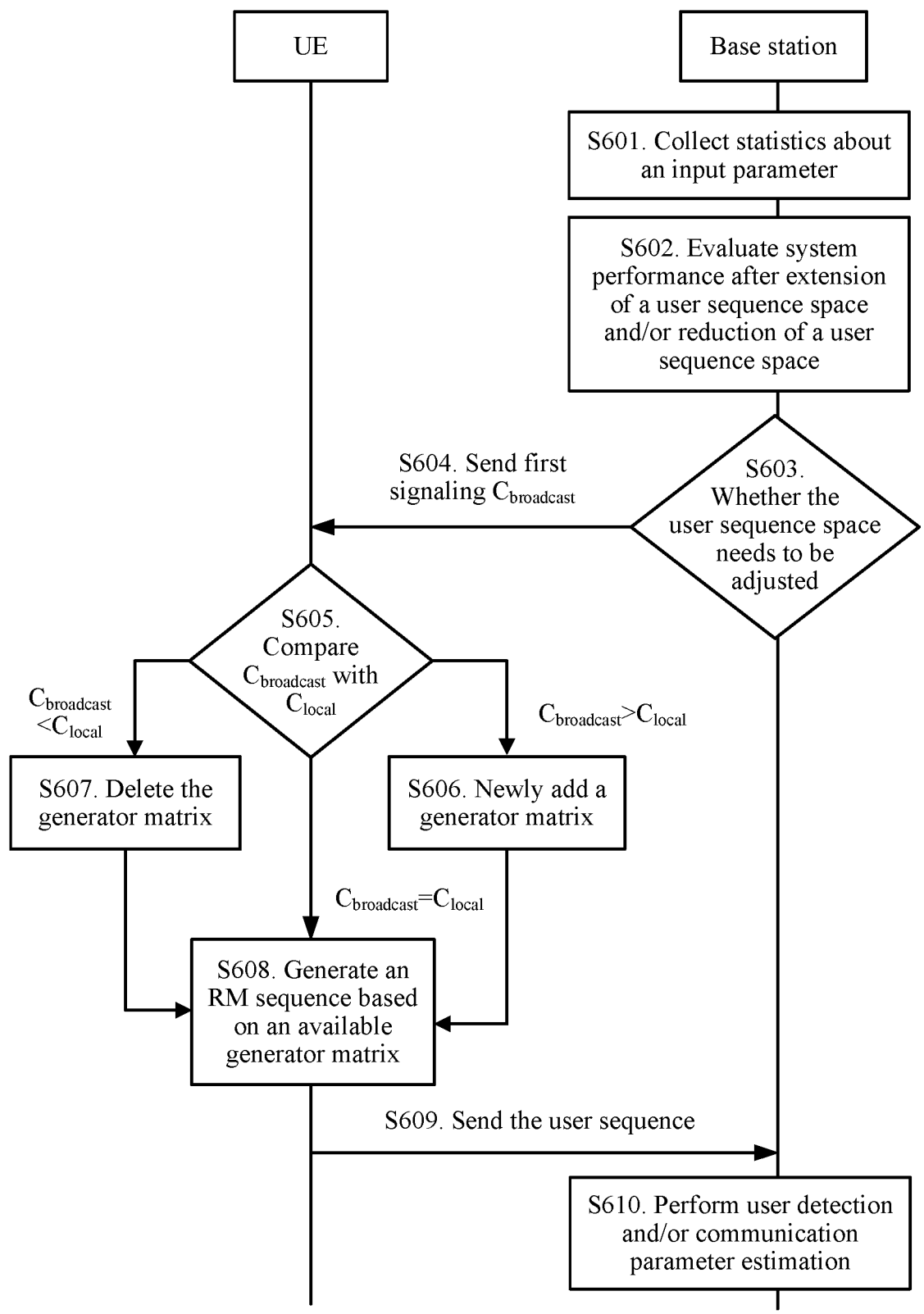
FIG. 6 is a schematic flowchart of a user sequence transmission method according to another embodiment of this application.

A specific example is used below to describe a procedure in which the system uses RM sequences to form a user sequence space and performs user processing. In this example, the base station controls a current user sequence space by using a solution in which a size of a user sequence space is adaptively adjusted, and the UE uses a solution in which a user sequence is generated in an online manner. In an actual implementation process, a method used may be but is not limited to the user sequence space control method and the user sequence generation method in this example. FIG. 6 is a schematic flowchart of a user sequence transmission method according to another embodiment of this application. The method in this example includes the following steps.

S601. The base station collects statistics about an input parameter. Specifically, the base station may collect statistics about an input parameter within a period, such as a quantity of access users, a system performance parameter, and a user sequence length. Optionally, the period may be a broadcast period.

S602. The base station evaluates, based on the system parameter, system performance after extension of a user sequence space and/or reduction of a user sequence space.

S603. The base station determines, based on an evaluation result, whether the user sequence space needs to be adjusted. It should be understood that adjustment herein mainly means adjusting a size of the user sequence space.

S604. The base station sends first signaling to the UE, where the first signaling includes a size $C_{broadcast}$ of an adjusted user sequence space. Optionally, the base station may send the first signaling through broadcast.

S605. The UE compares $C_{broadcast}$ with $C_{local}$; and performs S606 when $C_{broadcast} > C_{local}$; or performs S607 when $C_{broadcast} < C_{local}$.

S606. Newly add a generator matrix used to generate an RM sequence.

S607. Delete a part of the generator matrix used to generate an RM sequence.

S608. Generate an RM sequence based on an available generator matrix. Specifically, a matrix P is selected from an available generator matrix set, and then b is selected, to generate the RM sequence.

S609. The UE sends a user sequence to the base station, that is, the generated RM sequence.

S610. The base station performs user detection and/or communication parameter estimation based on the user sequence.

The base station indicates a size of a user sequence space available to the UE, and the UE may select, in an agreed manner, a set of user sequences that meet orthogonality (for example, may be a subset or a subspace of a user sequence space at a level), and select a user sequence of the UE from the set of user sequences.

A method for generating a sequence in an RM sequence space at each level is as follows:

Step 1: Generate an m×m binary matrix P set $\{P_1, \ldots, P_M\}$.

A user sequence space at a first level is any matrix P (corresponding to an orthogonal user sequence space with a size of N) in a Kerdock set.

A user sequence space at a second level is all of $N=2^m$ matrices P (corresponding to a quasi-orthogonal user sequence space with a size of $N^2$ that includes the user sequence space at the first level) in the Kerdock set.

A set of matrices P in a space at an L level is as follows: A matrix P set with a size of $M=2^{m(L-2)}$ is generated, that is, a Delsarte-Goethals (m, r) set, where r=L−1.

Step 2: Generate a set of binary vectors b with a length of m: $\{b_1, \ldots, b_N\}$.

Step 3: Generate, for each (P, b) pair according to the following formula, an RM sequence with a length of $N=2^m$.

$$\phi_{P,b}(x) = \frac{(-1)^{weight(b)}}{\sqrt{2^m}} i^{(2b+Px)^T x}, x = bin(k),$$

where
the item $$\frac{(-1)^{weight(b)}}{\sqrt{2^m}}$$

is an optional item, and is used as an amplitude normalization parameter A. In practice, a formula $\phi_{P,b}(x)=A \cdot i^{(2b+Px)^T x}$ may be used, where x=bin(k), a value of k is 0, 1, ..., $2^m-1$, bin(k) is a binary vector representation of k, and an amplitude normalization parameter A may be controlled and determined by upper layer power. P may be referred to as a generator matrix, and b may be referred to as a generator vector.

It should be understood that the user sequence space at the L level includes all user sequence spaces at low levels.

Step 4: After $2^{m(L-1)}$ RM sequences with a length of N may be generated in total by using the foregoing method, sort all the user sequences by using the following method: arranging a user sequence space at a low level before a user sequence space at a high level, to improve detection performance. In a user sequence space at a same level, to improve bandwidth channel estimation performance, a subspace (subset) whose peak-to-average power ratio (Peak-to-Average Power Ratio, PAPR) is small after a fast Fourier transformation (Fast Fourier Transformation, FFT) is performed is arranged after a subspace whose PAPR is large after a fast Fourier transformation is performed.

When a user sequence space is extended, for example, an adjustment step Δ=N (a size of an orthogonal user sequence space) may be used. A user sequence in the user sequence space at the first level (a completely orthogonal user sequence space) is first used. Then extension is performed in N orthogonal user sequences in the user sequence space at the second level. After all orthogonal spaces in the user sequence space at the second level are used completely, extension continues to be performed in the space at the third level, and so on.

Specifically, for example, an RM sequence with a length of 32 is used, and C≤1024 (that is, the user sequence space at the second level, namely, the Kerdock set is used). In this case, 32 orthogonal user sequence subspaces are sorted as follows: [10 17 32 15 23 8 28 9 2 24 16 14 27 5 25 7 29 22 11 12 26 4 30 20 13 3 6 19 18 31 21 1]. A sequence number is a sequence number of a matrix P corresponding to high m(r+1) bits in the following detailed rule (each matrix P is corresponding to an orthogonal user sequence subspace). During user sequence extension, the orthogonal user sequence subspaces may be extended in this order, and during user sequence reduction, the user sequence subspaces are reduced in a reverse sequence of this order.

For another example, an RM sequence with a length of 64 is used, and C≤4096 (that is, the user sequence space at the second level, namely, the Kerdock set is used). In this case, 64 orthogonal subspaces are sorted as follows: [7 25 36 17 4 33 56 46 26 2 45 60 47 55 43 12 5 27 15 16 63 44 20 38 61 51 29 40 52 35 23 30 21 57 13 8 31 49 42 39 32 6 19 62 18 41 11 37 9 54 10 28 24 59 50 22 53 58 34 64 14 48 3 1]. A sequence number is a sequence number of a matrix P corresponding to high m(r+1) bits in the following detailed rule (each matrix P is corresponding to an orthogonal user sequence subspace).

Step 5: User sequences included in a first user sequence space with a user sequence space size of C are the first C user sequences obtained after sorting.

The detailed rule for generating an RM sequence is as follows:

A matrix P required for generating an RM sequence space at each level may be selected from the following nested spaces:

$$DG(m,0) \subset DG(m,1) \subset \ldots \subset DG(m,r)$$

DG is DG(m, 0) short for a Delsarte-Goethals set that is also referred to as a Kerdock set.

The Kerdock set includes $2^m$ matrices P in total, and the $2^m$ matrices P are generated by using the following steps:

$$Tr[xya]=(x_0 \ldots x_{m-1})P^0(a)(y_0 \ldots y_{m-1})^T, \text{ where}$$

$Tr[x]=x+x^2+\ldots x^{2^{m-1}}$ is mapping of an element x of $F_{2^m}$ to a binary field $F_2$. All calculations are in a finite field.

Therefore, an element in an $i^{th}$ row and a $j^{th}$ of the matrix P may be obtained in the following manner:

1. Assume that an $i^{th}$ bit of a vector $x_0 \ldots x_{m-1}$ is 1 and all the other bits are 0, and assume a $j^{th}$ bit of a vector $y_0 \ldots y_{m-1}$ is 1 and all the other bits are 0.

2. Respectively map the two binary field $F_2$ vectors with a length of m to elements x and y of $F_{2^m}$, and calculate Tr[xya].

3. An element in an $i^{th}$ row and a $j^{th}$ column of an $a^{th}$ matrix P in the Kerdock set is Tr[xya]. $F_{2^m}$ has $2^m$ elements a in total that are in a one-to-one correspondence with the $2^m$ matrices P.

DG(m, r) includes $2^{m(r+1)}$ matrices P in total, and the $2^{m(r+1)}$ matrices P are generated by using the following method:

$$DG(m, r) = \left\{ \sum_{t=0}^{r} P^t(a_t) \,\middle|\, a_t \in F_{2^m}, t = 0, 1, \ldots, r \right\}$$

Because there are r+1 $F_{2^m}$ elements $a_0, a_1, \ldots, a_r$ in total, and each a has $2^m$ values, $2^{m(r+1)}$ matrices P may be generated in total.

It may be learned from the foregoing formula that each matrix P is a linear combination of $P^t$, t=0, 1, . . . , r. Therefore, DG(m, r) includes all lower order sets. Herein, $P^t$ may be obtained according to the following formula:

$$Tr[(xy^{2^t}+x^{2^t}y)a]=(x_0 \ldots x_{m-1})P^t(a)(y_0 \ldots y_{m-1})^T$$

A specific method for calculating $P^t$ is the same as that for calculating $P^0$ in the Kerdock set. Details are not described herein again.

A method for generating a sequence in an original order (an order before sorting):

In conclusion, the total $2^{m(r+1)}$ matrices P included in DG(m, r) and $2^m$ vectors b may be used to generate $2^{m(r+2)}$ RM sequences in total. The total $2^{m(r+2)}$ RM sequences generated by using DG(m, r) are represented by a binary sequence number with a length of m(r+2).

1. Divide the sequence number with a length of m(r+2) into lowest m bits and the other m (r+1) bits.

2. A vector corresponding to the lowest m bits is a vector b.

3. Convert the other m (r+1) bits into a $2^m$-ary vector with a length of r+1, where each element is mapped to an element $a_t$, t=0, 1, . . . , r of $F_{2^m}$, then the element $a_t$, t=0, 1, . . . , r is mapped to $P^t$, t=0, 1, . . . , r; and finally calculate, based on a DG(m, r) generation method, a matrix P obtained after a linear combination.

4. Calculate an RM sequence based on an RM sequence generation formula by using the matrix P and the vector b.

In the method in this embodiment of this application, a quasi-orthogonal sequence constructed by using a Reed-Muller (RM) code is used, so that extremely low detection complexity can be achieved while a user sequence space is greatly extended.

This is because a fast Hadamard transform is used for user detection based on an RM sequence, and a required quantity of multiplications is $$\frac{\log N}{N}$$

of a ZC sequence (correlation is sequentially performed). In addition, an extremely important point lies in the following: The RM sequence takes a value only from {±1, ±i}. Therefore, each multiplication only needs to change a sign (perform only bit inverting) when correlation is performed, without a need to perform floating-point complex number multiplication like the ZC sequence, so that complexity of each multiplication is greatly reduced (even may be ignored) compared with the ZC sequence. Therefore, when user detection (large space search) is performed by using the RM sequence, complexity is not significantly increased. A comparison between quantities of multiplications for user detection is specifically shown in Table 6. Final detection complexity mainly comes from a quantity of multiplications× complexity of each multiplication. Table 6 lists only statistics about the quantity of multiplications without considering complexity of each multiplication. Because complexity of each multiplication (bit inverting) performed for the RM sequence may be almost ignored compared with the ZC (the floating-point complex number multiplication), overall detection complexity of the RM sequence is much lower than estimation in Table 6.

TABLE 6

Quantity of multiplications for user detection

| User sequence length | Quantity of multiplications for user detection (RM sequence/ZC sequence) |
| --- | --- |
| 64 | 9.38% |
| 128 | 5.47% |
| 256 | 3.13% |

For a quasi-orthogonal user sequence space, when a system uses the RM sequence, the user sequences in the first user sequence space include a Zadoff-Chu sequence generated based on the at least two root indexes.

Figure 7:
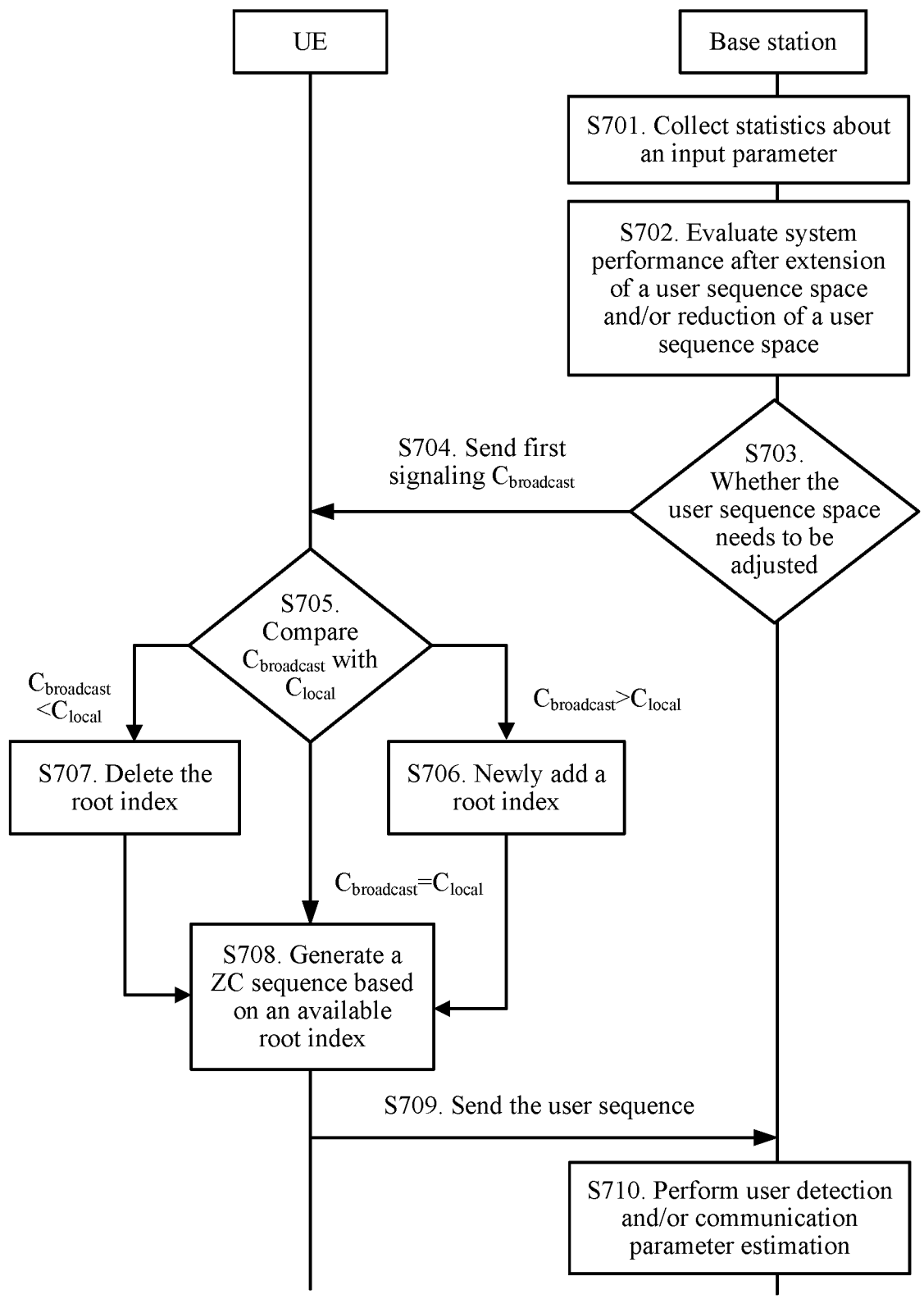
FIG. 7 is a schematic flowchart of a user sequence transmission method according to another embodiment of this application.

A specific example is used below to describe a procedure in which the system uses ZC sequences to form a user sequence space and performs user processing. In this example, the base station controls a current user sequence space by using a solution in which a size of a user sequence space is adaptively adjusted, and the UE uses a solution in which a user sequence is generated in an online manner. In an actual implementation process, a method used may be but is not limited to the user sequence space control method and the user sequence generation method in this example. FIG. 7 is a schematic flowchart of a user sequence transmission method according to another embodiment of this application. The method in this example includes the following steps.

S701. The base station collects statistics about an input parameter. Specifically, the base station may collect statistics about an input parameter within a period, such as a quantity of access users, a system performance parameter, and a user sequence length. Optionally, the period may be a broadcast period.

S702. The base station evaluates, based on the system parameter, system performance after extension of a user sequence space and/or reduction of a user sequence space.

S703. The base station determines, based on an evaluation result, whether the user sequence space needs to be adjusted. It should be understood that adjustment herein mainly means adjusting a size of the user sequence space. S704 is performed when the user sequence space needs to be adjusted. When the user sequence space does not need to be adjusted, subsequent steps are not performed, S701 and S702 are performed, and a next period is waited for, to continue to evaluate the system performance after extension of the user sequence space and/or reduction of the user sequence space.

S704. The base station sends first signaling to the UE, where the first signaling includes a size $C_{broadcast}$ of an adjusted user sequence space. Optionally, the base station may send the first signaling through broadcast.

S705. The UE compares $C_{broadcast}$ with $C_{local}$; and performs S706 when $C_{broadcast} > C_{local}$; or performs S707 when $C_{broadcast} < C_{local}$.

S706. Newly add a root index used to generate a ZC sequence.

S707. Delete a part of the root index used to generate a ZC sequence.

S708. Generate a ZC sequence based on an available root index. Specifically, a root index is selected from a set of available root indexes to generate a base sequence, and a cyclic shift is selected, to generate the ZC sequence.

S709. The UE sends a user sequence to the base station, that is, the generated ZC sequence.

S710. The base station performs user detection and/or communication parameter estimation based on the user sequence.

A method for generating a sequence in a ZC sequence space at each level is as follows:

Step 1: Generate a set $\{r_1, \ldots, r_N\}$ of available root indexes (roots).

A user sequence space at a first level is any r value (corresponding to an orthogonal user sequence space with a size of N) ranging from 1 to N.

A user sequence space at a second level is all r values (corresponding to a quasi-orthogonal user sequence space with a size of $N^2$, where the quasi-orthogonal user sequence space includes the orthogonal user sequence space at the first level) ranging from 1 to N.

Step 2: Select a value from 0 to N−1 as a cyclic shift value.

Step 3: For all selectable root index sets and all cyclic shift values, first generate a ZC base sequence with a length of N according to the following formula, and then perform corresponding cyclic shifting to obtain a user sequence.

$$x_r(n) = \exp\left(-j\frac{\pi r n(n+1)}{N}\right),$$

where ceil( ) represents rounding up. For the ZC sequence, a coherent degree requirement may be met by setting a user sequence length N to a prime number. The ZC sequence supports only the user sequence space at the second level, and extensibility of the ZC sequence is not as good as that of an RM sequence.

In this embodiment of this application, if a ZC sequence with a length of N is used, when a size of a user sequence space is C, a quantity of used root indexes is ceil(C/N). All available root indexes (usually, to ensure better performance, it may be stipulated that a root index and a sequence length need to be relatively prime) are sorted and numbered as follows: {1, . . . , ceil (C/N)}. During space extension, root indexes r are sequentially selected, to generate a ZC base sequence with a length of N. Therefore, N×ceil(C/N) sequences may be sequentially generated, and a user sequence space formed by using the first C ZC sequences is a first user sequence space.

Figure 8:
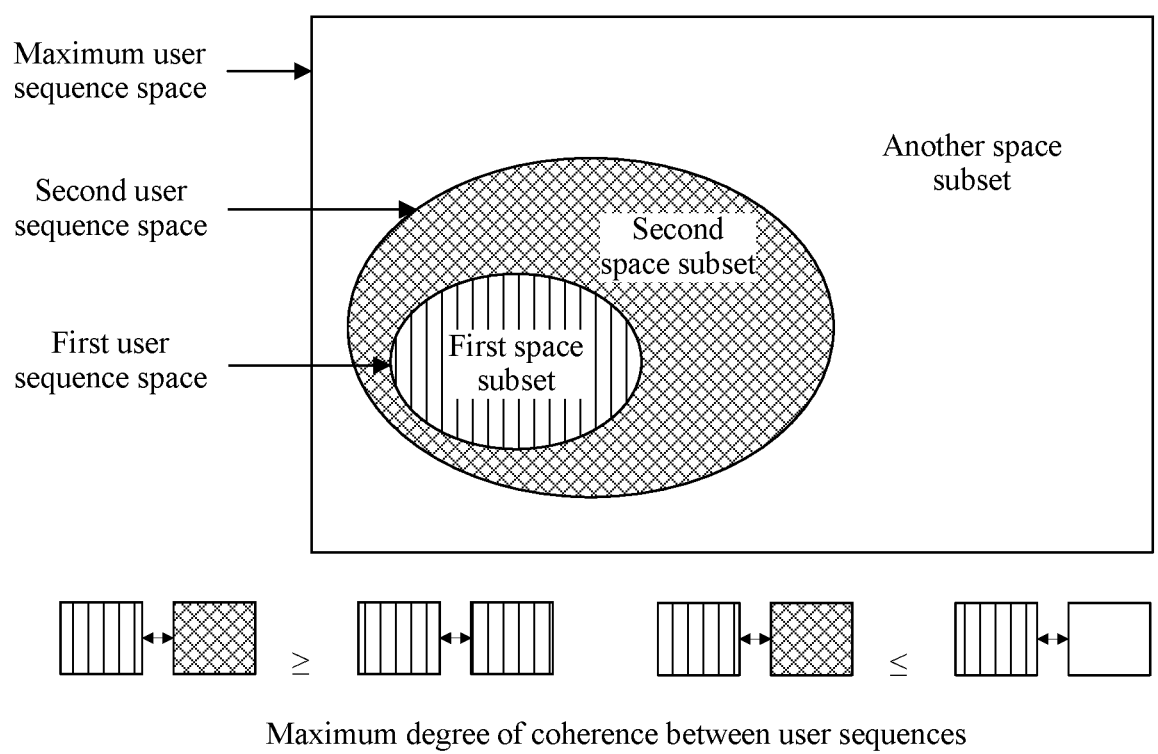
FIG. 8 is a schematic diagram of extension of a user sequence space according to an embodiment of this application.

The foregoing described extension of a user sequence space may be corresponding to a dynamic process of extending a user sequence space. FIG. 8 is a schematic diagram of extension of a user sequence space according to an embodiment of this application. As shown in FIG. 8, the user sequence space is extended from a first user sequence space to a second user sequence space. From a signaling perspective, corresponding to the method in the embodiments of this application, this process further includes: sending, by the network device, second signaling to the terminal device (refer to S309 in FIG. 3). The second signaling includes second information indicating a quantity of user sequences in the second user sequence space, the second user sequence space includes a first space subset and a second space subset, the first space subset and the second space subset are completely different, user sequences included in the first space subset are completely the same as the user sequences in the first user sequence space, and a degree of coherence between each user sequence in the second space subset and the user sequence in the first space subset is less than or equal to a degree of coherence between a user sequence outside the second user sequence space and the user sequence in the first space subset.

As shown in FIG. 8, the degree of coherence between the user sequence in the first space subset and the user sequence in the second space subset is greater than or equal to a degree of coherence between two user sequences in the first space subset. The degree of coherence between the user sequence in the first space subset and the user sequence in the second space subset is less than or equal to a degree of coherence between the user sequence in the first space subset and a user sequence in another space subset.

It may be understood that if a corresponding space level of the first user sequence space is M herein, the second space subset includes a user sequence whose space level is greater than or equal to M.

The first user sequence space is extended to the second user sequence space, and a maximum coherence degree of the second user sequence space obtained after extension is greater than or equal to a maximum coherence degree of the first user sequence space before extension. The maximum coherence degree is a maximum value of a degree of coherence between any two user sequences in the user sequence space.

The network device may also instruct, by using the following method, the terminal device to extend from the first user sequence space to the second user sequence space. After the sending, by a network device, first signaling to a terminal device, the method further includes: sending, by the network device, second signaling to the terminal device, where the second signaling includes second information indicating orthogonality of the second user sequence space, and the orthogonality of the second user sequence space is weaker than or equal to orthogonality of the first user sequence space.

A specific manner may be as follows: After the sending, by a network device, first signaling to a terminal device, the method further includes: sending, by the network device, the second signaling to the terminal device, where the second signaling includes the second information indicating the orthogonality of the second user sequence space, and a maximum value of a degree of coherence between any two user sequences in the second user sequence space is greater than or equal to a maximum value of a degree of coherence between any two user sequences in the first user sequence space.

Alternatively, a specific manner may be as follows: After the sending, by a network device, first signaling to a terminal device, the method further includes: sending, by the network device, the second signaling to the terminal device, where the second signaling includes the second information indicating the orthogonality of the second user sequence space, and a space level of the second user sequence space is greater than or equal to a space level of the first user sequence space.

Figure 9:
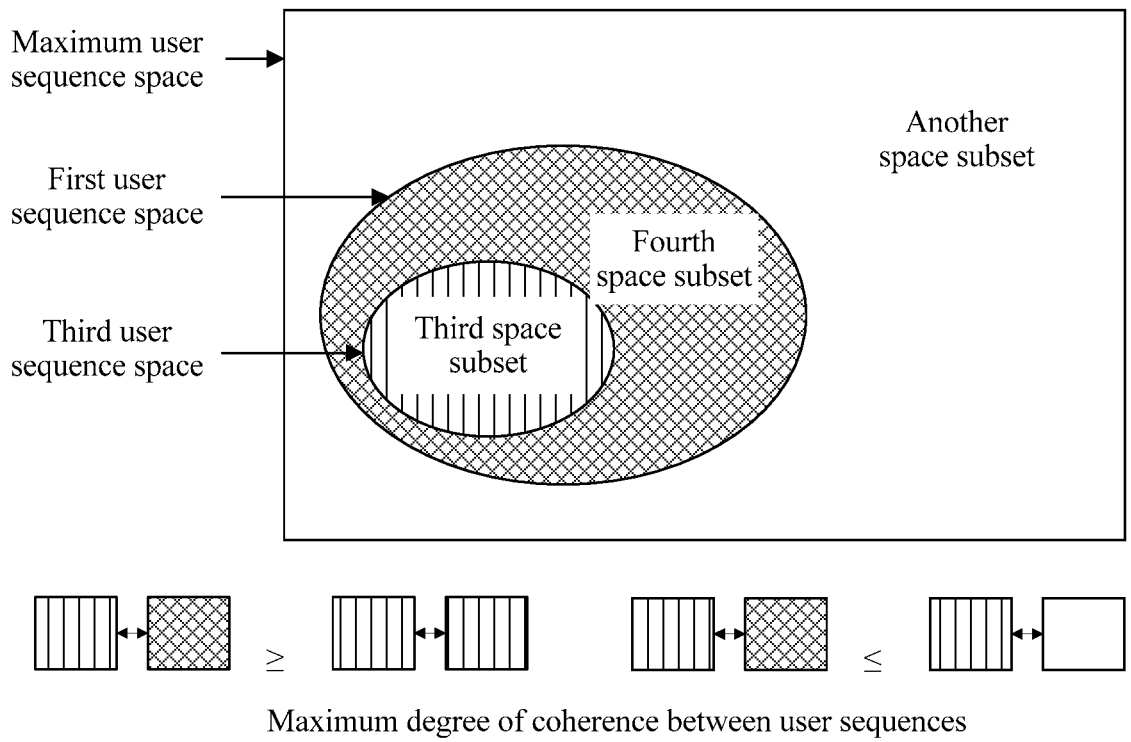
FIG. 9 is a schematic diagram of reduction of a user sequence space according to an embodiment of this application.

The foregoing described reduction of a user sequence space may be corresponding to a dynamic process of reducing a user sequence space. FIG. 9 is a schematic diagram of reduction of a user sequence space according to an embodiment of this application. As shown in FIG. 9, the user sequence space is reduced from a first user sequence space to a third user sequence space. From a signaling perspective, corresponding to the method in the embodiments of this application, this process further includes:

sending, by the network device, third signaling to the terminal device, where the third signaling includes third information indicating a quantity of user sequences in the third user sequence space, user sequences in the third user sequence space are completely the same as user sequences included in the third space subset, the first user sequence space includes a third space subset and a fourth space subset, the third space subset and the fourth space subset are completely different, and a degree of coherence between each user sequence in the fourth space subset and a user sequence in the third space subset is greater than or equal to a degree of coherence between any two user sequences in the third space subset.

As shown in FIG. 9, the degree of coherence between the user sequence in the third space subset and the user sequence in the fourth space subset is greater than or equal to the degree of coherence between the two user sequences in the third space subset. The degree of coherence between the user sequence in the third space subset and the user sequence in the fourth space subset is less than or equal to a degree of coherence between the user sequence in the third space subset and a user sequence in another space subset.

The first user sequence space is reduced to the third user sequence space, and a maximum coherence degree of the third user sequence space obtained after reduction is less than or equal to a maximum coherence degree of the first user sequence space before reduction.

The network device may also instruct, by using the following method, the terminal device to reduce from the first user sequence space to the second user sequence space. After the sending, by a network device, first signaling to a terminal device, the method further includes: sending, by the network device, third signaling to the terminal device, where the third signaling includes third information indicating orthogonality of the third user sequence space, and the orthogonality of the third user sequence space is stronger than or equal to orthogonality of the first user sequence space.

A specific manner may be as follows: After the sending, by a network device, first signaling to a terminal device, the method further includes: sending, by the network device, the third signaling to the terminal device, where the third signaling includes the third information indicating the orthogonality of the third user sequence space, and a maximum value of a degree of coherence between any two user sequences in the third user sequence space is less than or equal to a maximum value of a degree of coherence between any two user sequences in the first user sequence space.

Alternatively, a specific manner may be as follows: After the sending, by a network device, first signaling to a terminal device, the method further includes: sending, by the network device, the third signaling to the terminal device, where the third signaling includes the third information indicating the orthogonality of the third user sequence space, and a space level of the third user sequence space is less than or equal to a space level of the first user sequence space.

In the foregoing solutions, a user sequence space may be flexibly extended or reduced through signaling notification, and a maximum coherence degree of a user sequence space obtained after extension or reduction keeps as small as possible, so that accuracy of user detection or communication parameter estimation may be ensured.

Figure 10:
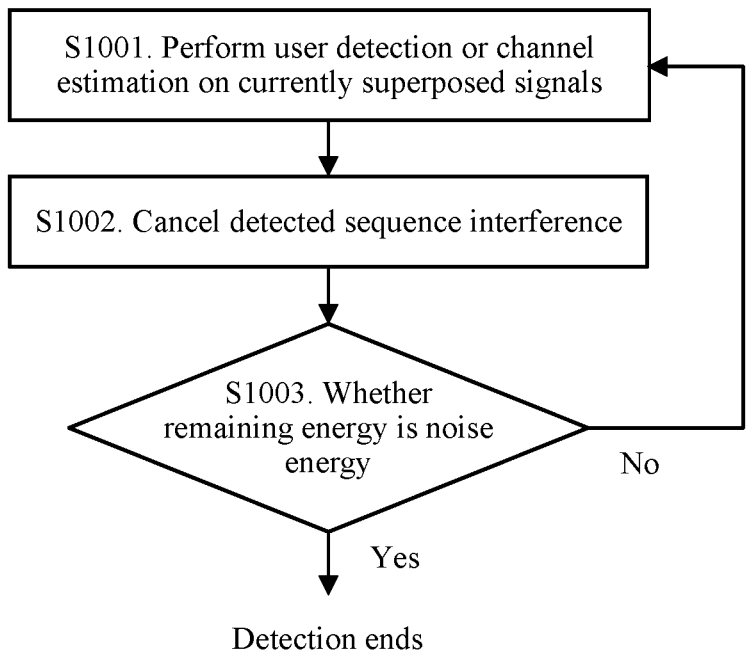
FIG. 10 is a schematic flowchart of a user detection process according to an embodiment of this application.

Interference is generated between quasi-orthogonal sequences, and this affects user detection performance. When a base station uses an interference cancellation-based successive user detection method, a user detection performance loss caused by non-orthogonality may be suppressed to a maximum extent. A specific process is a schematic flowchart of a user detection process shown in FIG. 10.

S1001. Perform user detection or channel estimation on a currently received signal.

S1002. Cancel detected sequence interference. It should be understood that interference cancellation in this embodiment of this application may be based on the prior art, and details are not described herein.

S1003. Determine whether remaining energy is noise energy; and detection ends when the remaining energy is the noise energy; or perform S1001 when the remaining energy is not the noise energy.

In a specific embodiment of this application, the first user sequence is a random access signal, and the performing, by the network device, user detection and/or communication parameter estimation based on the first user sequence may include: performing, by the network device, user detection based on the random access signal, and performing a random access process for the terminal device.

In a cellular mobile communications system, random access (Random Access) is an access process before UE starts to communicate with a network. Random access is usually used to identify a new access user, and implement uplink timing synchronization for a user that has not obtained or has lost uplink synchronization, so as to schedule an uplink orthogonal resource.

Figure 11:
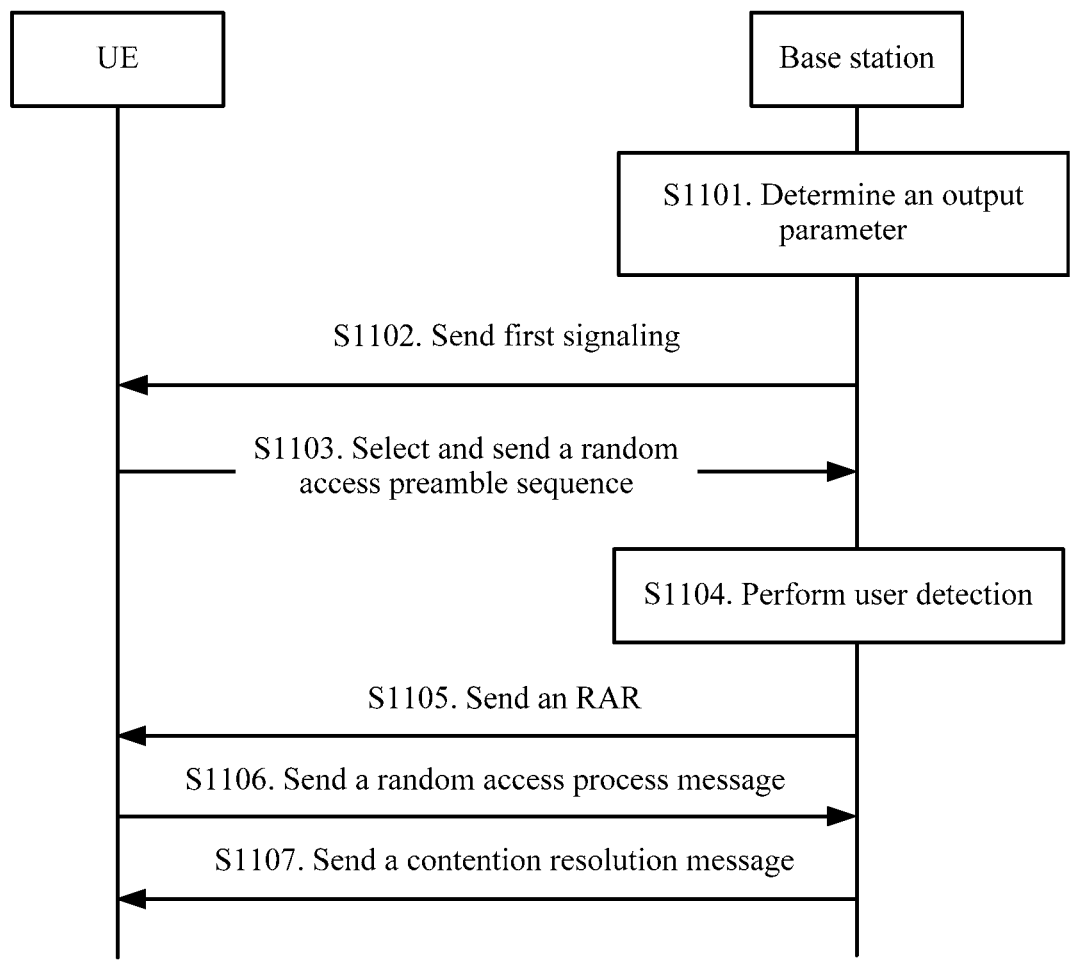
FIG. 11 is a schematic flowchart of a contention-based random access process according to an embodiment of this application.

User initialization is a contention-based random access process. In this process, a user randomly selects an access preamble (Preamble) sequence. Because each user independently selects a sequence during initial access, and therefore, there is a possibility that a plurality of users simultaneously transmit a same preamble sequence, causing an access conflict. FIG. 11 is a schematic flowchart of a contention-based random access process according to an embodiment of this application.

S1101. A base station determines an output parameter. This is corresponding to step S302 in the foregoing embodiment.

S1102. The base station sends a size of a current user sequence space, and may further send a user sequence type if necessary. For example, in some scenarios, the base station specifies use of a ZC sequence, to be compatible with an existing process and the prior art. For another example, a system may stipulate that a ZC sequence is used when a user sequence space is less than a preset threshold, and that an RM sequence is used when the user sequence space is greater than the preset threshold. It should be understood that the foregoing two indication scenarios of a user sequence type are merely an example instead of a limitation.

S1103. UE selects a random access preamble sequence, or referred to as a random access signal, from the specified user sequence space and sends the random access preamble sequence. When the base station sends the user sequence type, the UE selects the random access preamble sequence from the specified user sequence space based on the user sequence type sent by the base station, and sends the random access preamble sequence.

S1101 to S1103 are different from a random access solution in an existing LTE protocol, because the base station needs to indicate the size of the currently used user sequence space, and the UE sends the random access preamble sequence to the base station on a physical random access channel (Physical Random Access Channel, PRACH) specified by the system.

S1104. The base station performs user detection.

S1105. The base station sends a random access response (Random Access Response, RAR) based on a detection result for the random access preamble sequence.

S1106. UEs that are not in conflict transmit an accurate random access process message, for example, a tracking area update request or a scheduling request.

S1107. The base station sends a contention resolution message.

A resource configuration of the PRACH determines allocation of resources used for random access and data transmission. More resources allocated to the PRACH indicate fewer resources used for data transmission. Random access preamble sequences may be used to distinguish between different users on a same PRACH time-frequency resource. If more than one user transmits a same random access preamble sequence on a same PRACH time-frequency resource, a conflict occurs, causing a random access failure. In this embodiment, because an extended user sequence space is used, a probability of a conflict between users is greatly decreased, and access performance is significantly improved compared with the existing solution.

In another specific embodiment of this application, the first user sequence is a user detection reference signal, and the performing, by the network device, user detection and/or communication parameter estimation based on the first user sequence may include: performing user detection based on the user detection reference signal, and determining at least one of a time domain resource, a frequency domain resource, and a code domain resource that are used when data transmission is performed.

The specific embodiment may be applied to an application scenario of scheduling-free uplink user detection. The following is described in this embodiment of this application: When scheduling-free (Grant-free) uplink transmission based on sparse code multiple access (Sparse Coded Multiple Access, SCMA) is performed, a sequence in an extensible space is used as a user pilot (pilot) in this embodiment of this application. Certainly, in actual implementation, this is not limited to an application of SCMA-based scheduling-free uplink transmission.

Before performing SCMA-based uplink transmission, the UE selects, as a pilot of the UE, a user sequence from an available user sequence space indicated by the base station. The pilot herein usually has two functions: One function is that the pilot is used as an identifier of a user to notify the base station that the user is about to transmit uplink data, and the second function is to notify the base station of an SCMA codebook, that is, a to-be-used time-frequency resource, used for to-be-transmitted data. Advantages of this scheduling-free transmission manner lie in the following: The UE and the base station do not need to send signaling to each other to allocate a time-frequency resource, and this not lonely reduces sequence overheads, but also shortens a delay. However, this scheduling-free transmission manner still has a problem that if two users simultaneously select a same sequence as a pilot, the base station cannot distinguish between the two users, and usually also cannot correctly demodulate uplink data of the two users. Because use of an extended user sequence space is allowed in this embodiment of this application, a probability of a pilot collision between users may be greatly decreased, thereby improving uplink transmission efficiency of scheduling-free SCMA system.

In another specific embodiment of this application, the user sequence is a demodulation reference signal, the first user sequence is a demodulation reference signal, and the performing user detection and/or communication parameter estimation based on the first user sequence may include: performing communication parameter estimation based on the demodulation reference signal to demodulate data, where communication parameter estimation includes at least one of time offset estimation, frequency offset estimation, and channel estimation.

The specific embodiment may be applied to both an application scenario of time-frequency offset estimation and an application of channel estimation. In the cellular mobile communications system, because coherent demodulation is used at a receive end, a transmission delay or a timing advance TA (Timing Advance), a frequency offset, and channel estimation need to be estimated as accurately as possible. A quasi-orthogonal sequence described in this embodiment of this application has relatively good orthogonality, and particularly, an RM sequence has a characteristic that adjacent shifts are orthogonal and is applicable to multipath channel estimation. Therefore the RM sequence may also be used as a demodulation reference signal DMRS.

Two DMRSs are usually embedded in one transmit frame, and each DMRS occupies all subcarriers. By using a phase difference between the two DMRSs and phase differences on different subcarriers, channel parameters such as a time offset, a frequency offset, and a channel response may be estimated. In a scheduling-free uplink transmission system, each UE selects a sequence from a specified sequence space as a DMRS. In this case, if different UEs select a same sequence, the receive end cannot accurately estimate a TA, a frequency offset, and a channel response. Because use of an extended sequence space is allowed in this embodiment of this application, a probability of a DMRS collision between users may be greatly decreased, thereby improving accuracy of channel parameter estimation in the scheduling-free system, and further improving transmission efficiency.

The user sequence transmission method according to the embodiments of this application is described above in detail with reference to FIG. 1 to FIG. 11, and a network device and a terminal device according to the embodiments of this application are described below in detail with reference to FIG. 12 to FIG. 15.

Figure 12:
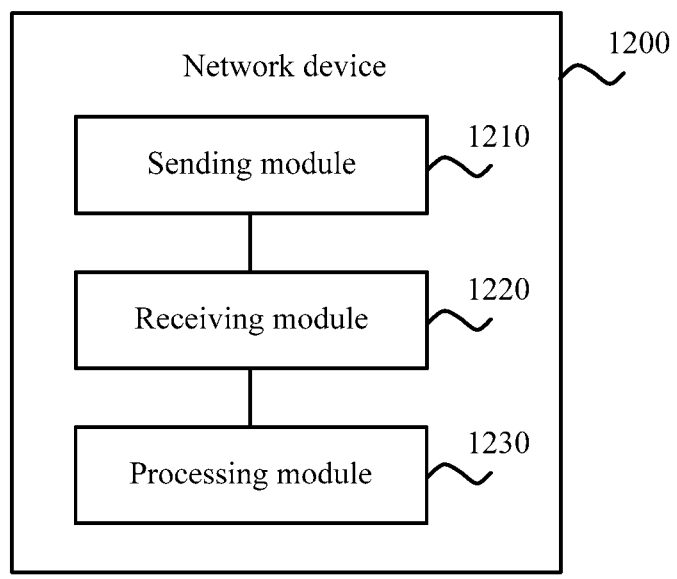
FIG. 12 is a schematic block diagram of a network device according to an embodiment of this application.

FIG. 12 is a schematic block diagram of a network device 1200 according to an embodiment of this application. As shown in FIG. 12, the network device 1200 includes:

a sending module 1210, configured to send first signaling to a terminal device, where the first signaling includes first information indicating a quantity of user sequences in a first user sequence space, and the user sequences in the first user sequence space include a universal set of user sequences used by the terminal device served by the network device;

a receiving module 1220, configured to receive a first user sequence that is sent by the terminal device based on the first information sent by the sending module 1210; and a processing module 1230, configured to perform user detection and/or communication parameter estimation based on the first user sequence received by the receiving module 1220.

Therefore, the network device in this embodiment of this application sends, to the terminal device, the first information indicating the quantity of user sequences in the first user sequence space, and the user sequences in the first user sequence space include the universal set of user sequences used by the terminal device served by the network device. Therefore, a size of a user sequence space that can be used by all terminal devices served by the network device may be flexibly specified, so as to support size adjustment for the user sequence space, thereby improving accuracy of user detection or communication parameter estimation, and improving work efficiency of a system.

Optionally, in an embodiment, the sending module 1210 is further configured to send second signaling to the terminal device after sending the first signaling to the terminal device, where the second signaling includes second information indicating a quantity of user sequences in a second user sequence space, the second user sequence space includes a first space subset and a second space subset, the first space subset and the second space subset are completely different, user sequences included in the first space subset are completely the same as the user sequences in the first user sequence space, and a degree of coherence between each user sequence in the second space subset and the user sequence in the first space subset is less than or equal to a degree of coherence between a user sequence outside the second user sequence space and the user sequence in the first space subset.

Optionally, in an embodiment, the first user sequence space includes a third space subset and a fourth space subset, the third space subset and the fourth space subset are completely different, and a degree of coherence between each user sequence in the fourth space subset and a user sequence in the third space subset is greater than or equal to a degree of coherence between any two user sequences in the third space subset. The sending module 1210 is further configured to send third signaling to the terminal device after sending the first signaling to the terminal device, where the third signaling includes third information indicating a quantity of user sequences in a third user sequence space, and user sequences in the third user sequence space are completely the same as user sequences included in the third space subset.

Optionally, in an embodiment, the sending module 1210 is specifically configured to send the first signaling to the terminal device through broadcast.

Optionally, in an embodiment, the first user sequence is generated by the terminal device according to a formula $\phi_{P,b}(x) = A \cdot i^{(2b+Px)^T x}$, where x=bin(k), a value of k is 0, 1, ..., $2^m-1$, bin(k) is a binary vector representation of k, A is an amplitude normalization parameter, P is a generator matrix, and b is a generator vector.

Figure 13:
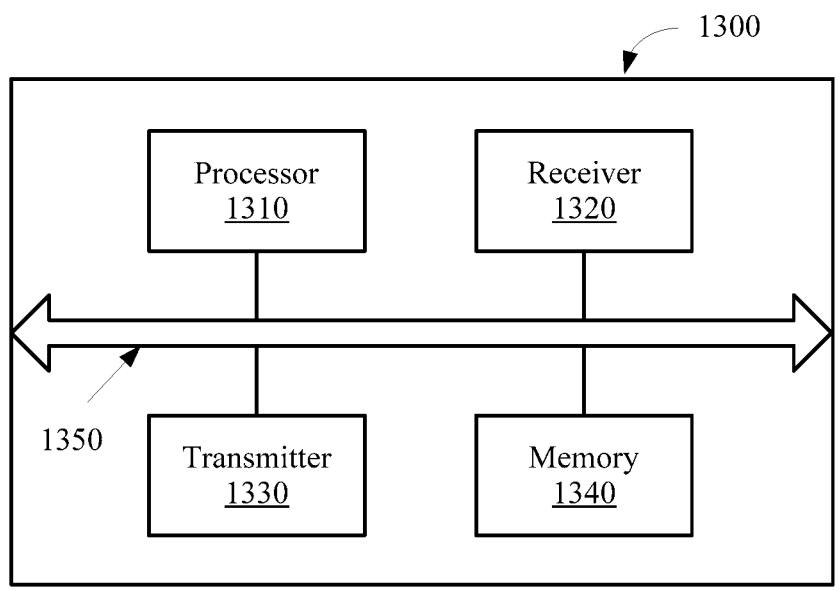
FIG. 13 is a schematic block diagram of a network device according to another embodiment of this application.

It should be noted that in this embodiment of this application, the receiving module 1220 may be implemented by a receiver, the sending module 1210 may be implemented by a transmitter, and the processing module 1230 may be implemented by a processor. As shown in FIG. 13, a network device 1300 may include a processor 1310, a receiver 1320, a transmitter 1330, and a memory 1340. The memory 1340 may be configured to store code or the like executed by the processor 1310.

Components in the network device 1300 are coupled together by using a bus system 1350. In addition to a data bus, the bus system 1350 includes a power bus, a control bus, and a status signal bus.

The network device 1200 shown in FIG. 12 or the network device 1300 shown in FIG. 13 can implement the processes implemented in the embodiments in FIG. 1 to FIG. 11. To avoid repetition, details are not described herein again.

It should be noted that the foregoing method embodiments of this application may be applied to a processor, or be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (digital signal processor, DSP), an application-specific integrated circuit (application specific integrated circuit, ASIC), a field programmable gate array (field programmable gate array, FPGA) or another programmable logical device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through description used as an example instead of a limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memory in the system and method described in this specification aims to include but is not limited to these memories and any memory of another proper type.

Figure 14:
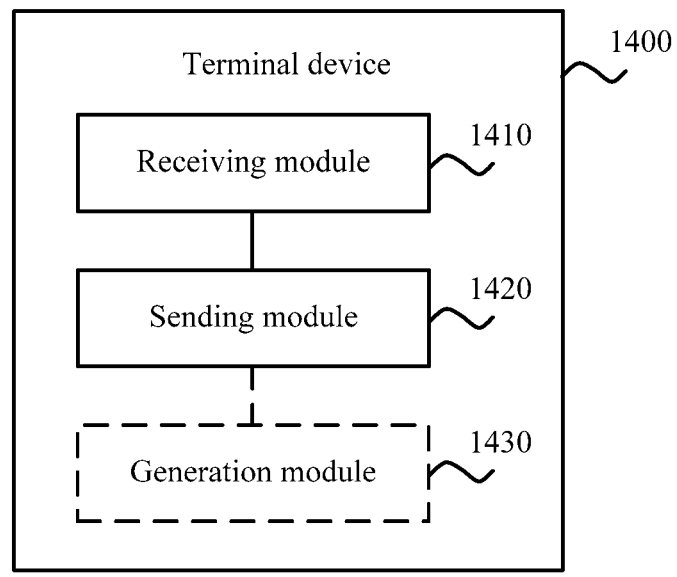
FIG. 14 is a schematic block diagram of a terminal device according to an embodiment of this application.

FIG. 14 is a schematic block diagram of a terminal device 1400 according to an embodiment of this application. As shown in FIG. 14, the terminal device 1400 includes:

a receiving module 1410, configured to receive first signaling sent by a network device, where the first signaling includes first information indicating a quantity of user sequences in a first user sequence space, and the user sequences in the first user sequence space include a universal set of user sequences used by the terminal device served by the network device; and a sending module 1420, configured to send a first user sequence to the network device based on the first information received by the receiving module 1410.

Optionally, in an embodiment, the receiving module 1410 is further configured to: after receiving the first signaling sent by the network device, receive second signaling sent by the network device, where the second signaling includes second information indicating a quantity of user sequences in a second user sequence space, the second user sequence space includes a first space subset and a second space subset, the first space subset and the second space subset are completely different, user sequences included in the first space subset are completely the same as the user sequences in the first user sequence space, and a degree of coherence between each user sequence in the second space subset and the user sequence in the first space subset is less than or equal to a degree of coherence between a user sequence outside the second user sequence space and the user sequence in the first space subset.

Optionally, in an embodiment, the first user sequence space includes a third space subset and a fourth space subset, the third space subset and the fourth space subset are completely different, and a degree of coherence between each user sequence in the fourth space subset and a user sequence in the third space subset is greater than or equal to a degree of coherence between any two user sequences in the third space subset. The receiving module 1410 is further configured to: after receiving the first signaling sent by the network device, receive third signaling sent by the network device, where the third signaling includes third information indicating a quantity of user sequences in a third user sequence space, and user sequences in the third user sequence space are completely the same as user sequences included in the third space subset.

Optionally, in an embodiment, the terminal device 1400 further includes a generation module 1430, configured to: before the sending module sends the first user sequence to the network device based on the first information, generate the first user sequence according to a formula $\phi_{P,b}(x) = A \cdot i^{(2b+Px)^T x}$, where $x = \text{bin}(k)$, a value of k is $0, 1, \ldots, 2^m - 1$, $\text{bin}(k)$ is a binary vector representation of k, A is an amplitude normalization parameter, P is a generator matrix, and b is a generator vector.

Optionally, in an embodiment the terminal device 1400 further includes the generation module 1430, configured to generate, based on the quantity that is of user sequences in the first user sequence space and that is indicated by the first information, the first user sequence belonging to the first user sequence space.

Optionally, in an embodiment, the receiving module 1410 is specifically configured to receive, through broadcast, the first signaling sent by the network device.

Figure 15:
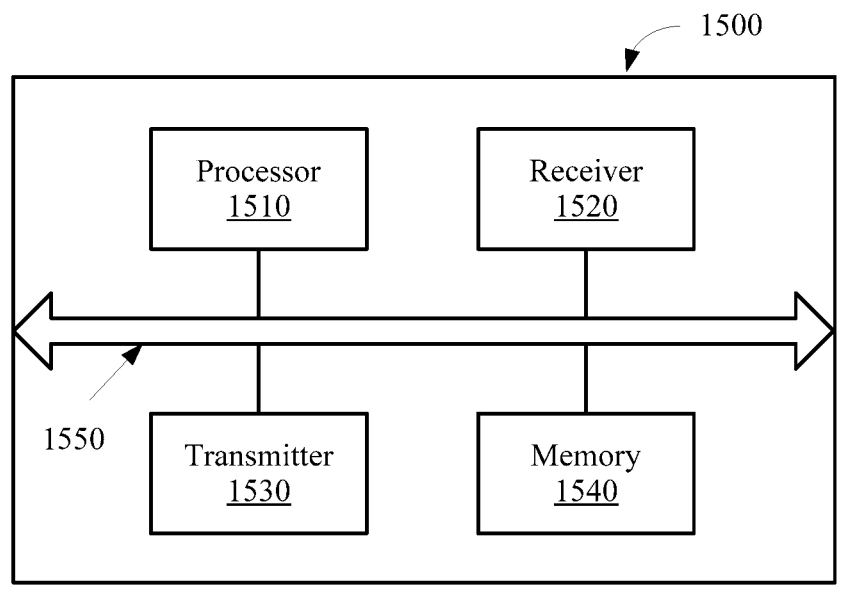
FIG. 15 is a schematic block diagram of a terminal device according to another embodiment of this application.

It should be noted that in this embodiment of this application, the receiving module 1410 may be implemented by a receiver, the sending module 1420 may be implemented by a transmitter, and the generation module 1430 may be implemented by a processor. As shown in FIG. 15, a network device 1500 may include a processor 1510, a receiver 1520, a transmitter 1530, and a memory 1540. The memory 1540 may be configured to store code or the like executed by the processor 1510.

The components in the terminal device 1500 are coupled together by using a bus system 1550. In addition to a data bus, the bus system 1550 further includes a power bus, a control bus, and a status signal bus.

The terminal device 1400 shown in FIG. 14 or the terminal device 1500 shown in FIG. 15 can implement the processes implemented in the embodiments in FIG. 1 to FIG. 11. To avoid repetition, details are not described herein again.

Optionally, the first signaling in the embodiments of this application may be carried in downlink control information (Downlink Control Information, DCI), or may be carried in radio resource control (Radio Resource Control, RRC) signaling. The RRC signaling may be higher layer signaling.

Optionally, the second signaling in the embodiments of this application may be carried in DCI, or may be carried in RRC signaling.

Optionally, the third signaling in the embodiments of this application may be carried in DCI, or may be carried in RRC signaling.

In the embodiments of this application, optionally, the first signaling may further include information indicating whether to use a scheduling-free transmission mode. For example, a field in the first signaling is indicating whether to use a scheduling-free transmission mode or a scheduling transmission mode. Certainly, a scheduling-free transmission mode may not be supported in the embodiments of this application.

In the embodiments of this application, optionally, before the sending, by a network device, first signaling to a terminal device, the method may further include: sending, by the network device, fourth signaling to the terminal device, where the fourth signaling indicates whether to use a scheduling-free transmission mode.

The network device may be configured as follows: When the network device and the terminal device perform communication with each other by using a scheduling-free transmission mode, the network device allows the terminal device to use a user sequence space dedicated to the scheduling-free transmission mode. When the network device and the terminal device perform communication with each other by using a scheduling transmission mode, the network device allows the terminal device to use a user sequence space dedicated to the scheduling transmission mode. Optionally, the user sequence space dedicated to the scheduling transmission mode has no user sequence the same as that in the user sequence space dedicated to the scheduling-free transmission mode.

Specifically, the dedicated the user sequence space indicating the scheduling-free transmission mode or the dedicated user sequence space indicating the scheduling transmission mode may be corresponding to the first user sequence space indicated by the first information in the first signaling, the second user sequence space indicated by the second information in the second signaling, and the third user sequence space indicated by the third information in the third signaling that are described above.

In the embodiments of this application, the first information, the second information, or the third information may be an index, and the index may include a root index (root) and an offset (cyclic shift value) that are of a demodulation reference signal (Demodulation Reference Signal, DMRS).

It should be understood that sequence numbers of the foregoing processes do not mean execution orders in various embodiments of this application. The execution orders of the processes should be determined according to functions and internal logic of the processes, and should not be construed as any limitation on the implementation processes of the embodiments of this application.

It should be understood that the first, the second, the third, the fourth, and various numbers in this specification are used for differentiation only for ease of description, instead of limiting the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A user sequence transmission method, comprising:
sending, by a network device, first signaling to a terminal device, wherein the first signaling comprises first information indicating a quantity of user sequences in a first user sequence space, wherein the user sequences in the first user sequence space comprise a universal set of user sequences used by the terminal device served by the network device, wherein the first signaling instructs the terminal device to randomly select or generate a first user sequence in the first user sequence space;
receiving, by the network device, the first user sequence sent by the terminal device based on the first information; and
performing, by the network device, user detection and/or communication parameter estimation based on the first user sequence.

2. The method according to claim 1, wherein the first information comprises an index indicating a configuration of the first user sequence space, the index is agreed on in advance in the network device and the terminal device, and the configuration of the first user sequence space comprises the quantity of user sequences in the first user sequence space.

3. The method according to claim 2, wherein the configuration of the first user sequence space further comprises at least one of a type of the user sequence in the first user sequence space, a space level of the first user sequence space, and a length of the user sequence in the first user sequence space.

4. The method according to claim 1, wherein the first information comprises a space level of the first user sequence space, or
a quantized value indicating the quantity of user sequences in the first user sequence space.

5. The method according to claim 1, wherein the universal set of user sequences used by the terminal device served by the network device comprises:
a user sequence used for contention-based access and a user sequence used for non-contention-based access.

6. The method according to claim 1, wherein the universal set of user sequences used by the terminal device served by the network device comprises:
a user sequence used for scheduling-free based access and a user sequence used for access that is based on scheduling performed by the network device.

7. The method according to claim 1, wherein the first user sequence is generated by the terminal device according to a formula $\phi_{P,b}(x) = A \cdot i^{(2b+Px)^T x}$, wherein x=bin(k), a value of k is 0, 1, ..., $2^m-1$, bin(k) is a binary vector representation of k, A is an amplitude normalization parameter, P is a generator matrix, and b is a generator vector.

8. The method according to claim 1, wherein after the sending, by a network device, first signaling to a terminal device, the method further comprises:
sending, by the network device, second signaling to the terminal device, wherein the second signaling comprises second information indicating a quantity of user sequences in a second user sequence space, wherein the second user sequence space comprises a first space subset and a second space subset, the first space subset and the second space subset being different, user sequences in the first space subset being the same as the user sequences in the first user sequence space, a degree of coherence between each user sequence in the second space subset and the user sequence in the first space subset being less than or equal to a degree of coherence between a user sequence outside the second user sequence space and the user sequence in the first space subset.

9. The method according to claim 1, wherein the first user sequence space comprises a third space subset and a fourth space subset, the third space subset and the fourth space subset being different, and a degree of coherence between each user sequence in the fourth space subset and a user sequence in the third space subset being greater than or equal to a degree of coherence between any two user sequences in the third space subset; and after the sending, by a network device, first signaling to a terminal device, the method further comprises:
sending, by the network device, third signaling to the terminal device, wherein the third signaling comprises third information indicating a quantity of user sequences in a third user sequence space, and user sequences in the third user sequence space are completely the same as user sequences comprised in the third space subset.

10. The method according to claim 1, wherein the first signaling further comprises fourth information indicating the type of the user sequence in the first user sequence space.

11. The method according to claim 1, wherein the type of the user sequence in the first user sequence space comprises a Reed-Muller sequence or a Zadoff-Chu sequence.

12. The method according to claim 1, wherein the first signaling is carried in downlink control information DCI or in radio resource control RRC signaling.

13. The method according to claim 1, wherein the first signaling further comprises information indicating whether to use a scheduling-free transmission mode.

14. A network device, comprising:
- a transmitter, configured to send first signaling to a terminal device, wherein the first signaling comprises first information indicating a quantity of user sequences in a first user sequence space, wherein the user sequences in the first user sequence space comprise a universal set of user sequences used by the terminal device served by the network device, wherein the first signaling instructs the terminal device to randomly select or generate a first user sequence in the first user sequence space;
- a receiver, configured to receive the first user sequence that is sent by the terminal device based on the first information sent by the transmitter; and
- a processor, configured to perform user detection and/or communication parameter estimation based on the first user sequence received by the receiver.

15. A terminal device, comprising:
- a receiver, configured to receive first signaling sent by a network device, wherein the first signaling comprises first information indicating a quantity of user sequences in a first user sequence space, and the user sequences in the first user sequence space comprise a universal set of user sequences used by the terminal device served by the network device, wherein the first signaling instructs the terminal device to randomly select or generate a first user sequence in the first user sequence space; and
- a transmitter, configured to send the first user sequence to the network device based on the first information received by the receiver.

16. The terminal device according to claim 15, wherein the first information comprises an index indicating a configuration of the first user sequence space, the index is agreed on in advance in the network device and the terminal device, and the configuration of the first user sequence space comprises the quantity of user sequences in the first user sequence space.

17. The terminal device according to claim 15, wherein the first information comprises a space level of the first user sequence space, or
- a quantized value indicating the quantity of user sequences in the first user sequence space.

18. The terminal device according to claim 15, wherein the terminal device further comprises a processor, configured to:
- before the transmitter sends the first user sequence to the network device based on the first information, generate the first user sequence according to a formula $\phi_{P,b}(x) = A \cdot i^{(2b+Px)^T x}$, wherein $x = \text{bin}(k)$, a value of k is $0, 1, \ldots, 2^m - 1$, $\text{bin}(k)$ is a binary vector representation of k, A is an amplitude normalization parameter, P is a generator matrix, and b is a generator vector.

19. The terminal device according to claim 15, wherein the receiver is further configured to:
- after receiving the first signaling sent by the network device, receive second signaling sent by the network device, wherein the second signaling comprises second information indicating a quantity of user sequences in a second user sequence space, wherein the second user sequence space comprises a first space subset and a second space subset, the first space subset and the second space subset being different, user sequences in the first space subset being the same as the user sequences in the first user sequence space, and a degree of coherence between each user sequence in the second space subset and the user sequence in the first space subset being less than or equal to a degree of coherence between a user sequence outside the second user sequence space and the user sequence in the first space subset.

20. The terminal device according to claim 15, wherein the first user sequence space comprises a third space subset and a fourth space subset, wherein the third space subset and the fourth space subset are different, and a degree of coherence between each user sequence in the fourth space subset and a user sequence in the third space subset is greater than or equal to a degree of coherence between any two user sequences in the third space subset; and the receiver is further configured to:
- after receiving the first signaling sent by the network device, receive third signaling sent by the network device, wherein the third signaling comprises third information indicating a quantity of user sequences in a third user sequence space, and user sequences in the third user sequence space are the same as user sequences comprised in the third space subset.

* * * * *